United States Patent [19]
Asa

[11] Patent Number: 6,095,730
[45] Date of Patent: Aug. 1, 2000

[54] TABLE-TOP TYPE KEY-SEATER

[75] Inventor: Yukihiro Asa, Tokyo, Japan

[73] Assignee: Asa Electronic Industry Co., Ltd., Tokyo, Japan

[21] Appl. No.: 09/228,011

[22] Filed: Jan. 8, 1999

[30] Foreign Application Priority Data

Jan. 21, 1998 [JP] Japan .................................. 10-025077
Jun. 10, 1998 [JP] Japan .................................. 10-178150

[51] Int. Cl.[7] .................................................. B23D 5/02
[52] U.S. Cl. .......................................... 409/307; 409/304
[58] Field of Search .............................. 408/18; 409/304, 409/307, 317, 321, 324, 326, 334

[56] References Cited

U.S. PATENT DOCUMENTS

| | | | |
|---|---|---|---|
| 978,073 | 12/1910 | Stowell | 90/39 |
| 1,745,573 | 2/1930 | Harten | 90/39 |
| 2,118,515 | 5/1938 | Larsen | 90/24.3 |
| 2,551,359 | 5/1951 | Bannow et al. | 90/44 |
| 2,868,090 | 1/1959 | McCullough | 90/39 |
| 4,778,316 | 10/1988 | Strait | 409/177 |
| 5,399,049 | 3/1995 | Abe et al. | 409/132 |
| 5,876,163 | 3/1999 | Nemeth et al. | 409/307 |

*Primary Examiner*—Stephen F. Gerrity
*Assistant Examiner*—Adrian M. Wilson
*Attorney, Agent, or Firm*—Flynn, Thiel, Boutell & Tanis, P.C.

[57] ABSTRACT

An inexpensive machine of small size is exclusively used for processing a key groove, requiring no skill. It is so constructed that a voltage is applied to an insulated work table through lead wires. A piece to be processed is reciprocated in left- and rightward directions. A center position of processing is calculated, based on digital displays of conduction signal positions, which left and right contact positions of a cutting tool inserted into a throughhole, in an inner wall of which the key groove should be formed, with the inner wall and a position of processing is set for the cutting tool by means of a scale, which position is fixed by using an eccentric lever. The work table is moved automatically intermittently with a cutting pitch set, linked with an air cylinder. A cutting distance for the key groove is set by a separation distance s between two magnetic sensors and cutting of the key groove K having a depth d is effected by moving the work table intermittently backward in a region, at two extremities of which the two magnetic sensors respond, respectively, to a magnet base, which is formed in one body with the work table.

9 Claims, 13 Drawing Sheets

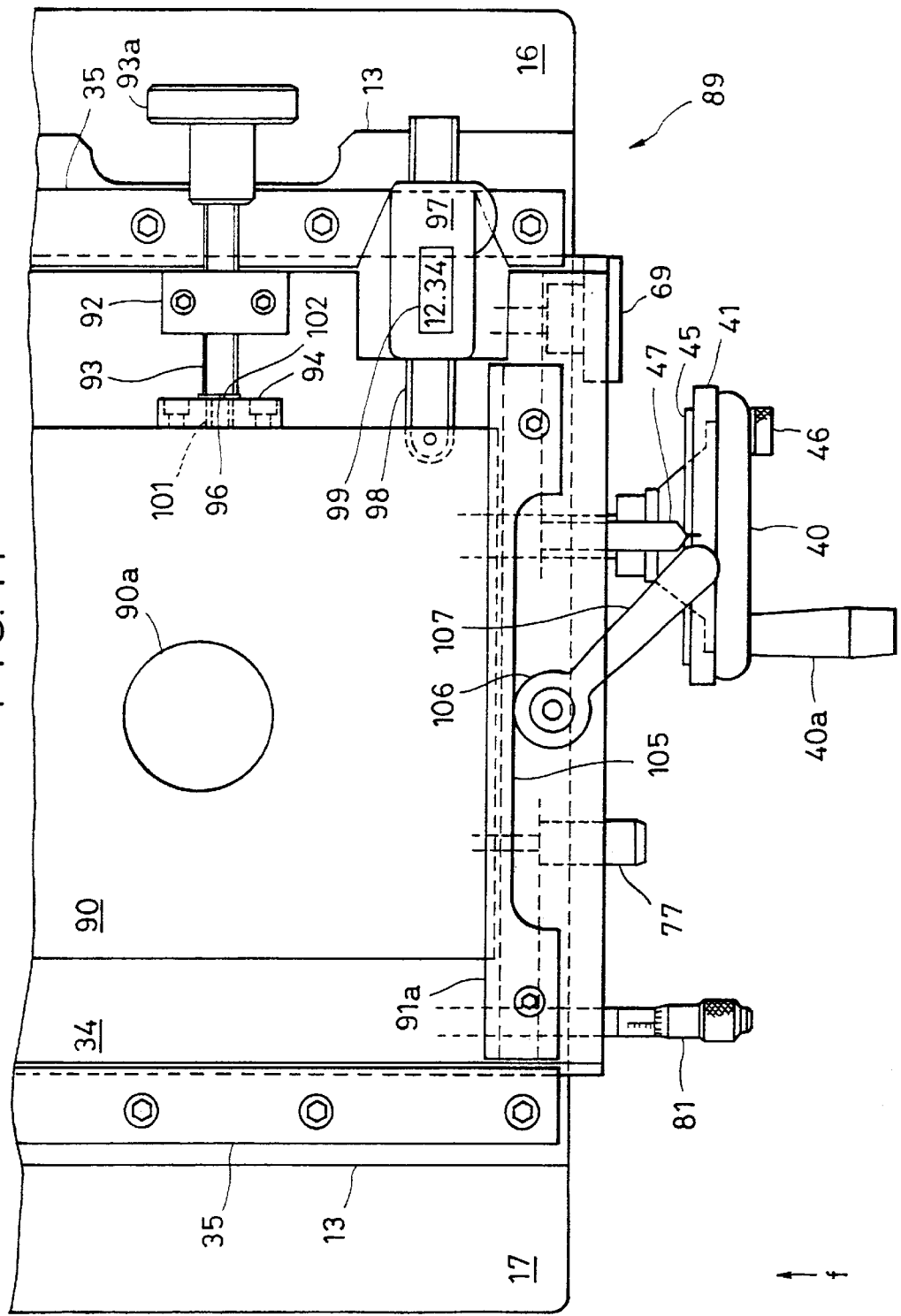

TABLE-TOP TYPE KEY-SEATER

FIELD OF THE INVENTION

The present invention relates to a small type slotter and more concretely to a machine exclusively used for cutting a key groove in an inner wall of a circular throughhole.

DESCRIPTION OF THE PRIOR ART

By a prior art method for forming a key groove in a small scale production position, in general, a chuck of a lathe is fixed so as not to be rotated, with which an object to be processed is clamped; and a key groove is formed by inserting a cutting tool secured to a cutting tool table into a throughhole and drawing it out therefrom by displacing manually a reciprocating table and at the same time by moving transversally the cutting tool table little by little along a ruled line drawn on an end surface of the object to be processed to cut an inner wall to form a key groove. Therefore this method is extremely inefficient.

On the other hand, under a mass production position of somewhat greater scale, a slotter is used therefor. However, in general, it is provided with an index, etc. so that it can process a spline or a serration, i.e. it is designed for wide use. Therefore it is expensive and it will be an excessive installation, if it is used for processing only key grooves. Since a general key slotting machine (key-seater) is a cutting machine by reciprocating movement of crank means, a reduction gear designed and fabricated particularly therefor is used so that it can bear a radial charge due to a load varying remarkably and having a great shock.

For this reason the machine itself is constructed by cast frames and has a large size. Therefore it is of installed type, requiring foundation work. If such a machine is used for a small object to be processed, not only power is consumed fruitlessly but also it is difficult to handle it and it has a low productivity. In addition, since setting of the object to be processed is effected by fitting visually the extremity of the cutting tool and a forwarding direction thereof to a form of a key drawn by a ruled line on an end surface of the object to be processed and cutting operation is effected also visually, relying on the ruled line, it is not allowed for a worker to quit the machine during the operation.

Moreover it is required to pay carefully attention to positioning exactly the cutting tool with respect to a position to be processed. In case where a high precision is required, a key groove cut tentatively is measured by means of an instrument and processing of products cannot be effected until correction has been repeated so that time loss is not little. In addition, since a round bar is often used for a cutting tool holder from a point of view of strength and a piece obtained by forming a rectangular hole in a side surface portion of an extremity part thereof and inserting an extremity of a chip, which is fixed, protruding towards a side, into this rectangular hole is used for the cutting tool, it is a work requiring a skillfulness to set a cutting tool while adjusting a cutting surface of the chip to a cutting forwarding direction. In any case products including key-seating have a low productivity, which has a bad influence on the cost thereof.

SUMMARY OF THE INVENTION

An object of the present invention is, therefore, to provide a small size and cheap machine exclusively used for key-seating, wherein setting can be effected without relying on a ruled line drawn on an object to be processed, whose operation is simple, requiring no skillfulness, in addition which has a simple mechanism having a small number of factors causing troubles, and for which maintenance and management are easy.

In order to achieve the above object, a table-top type key-seater according to the present invention is a machine for cutting a key-groove in an inner wall of a throughhole having a reduction gear with a motor; bearing means supporting rotatably a driving shaft coupled directly with this reduction gear with a motor; a reciprocating table provided with a cutting tool holder driven so as to reciprocate along a linear guide disposed in a perpendicular direction through crank means linked with the driving shaft in one body; a cutting tool for cutting the key groove mounted on the cutting tool holder; a work table moving horizontally in left- and rightward directions, to which an object to be processed having the throughhole is secured; and a feed table moving horizontally this working table in forward and backward directions; comprises further measuring means for setting a center position of processing, starting from a displacement amount of the work table with respect to left and right contact positions of the cutting tool brought into contact with an inner wall of the throughhole; feeding means, which makes the feed table move intermittently with a feed pitch for securing a predetermined depth of cut for every reciprocation of the cutting tool in synchronism with reciprocating movement of the cutting tool; and means for setting a depth of the key groove, which steps the reciprocating drive of the cutting tool at the upper limit in a perpendicular direction, when cut of the key groove reaches a predetermined depth of the key groove.

The work table is electrically insulated so that contact of the cutting tool with the inner wall of the throughhole can be detected electrically and length measuring means provided with digital display is adopted for the measuring means for setting the center position of processing.

The feeding means consists of a first air cylinder, a swing arm pivoting while reciprocating a piston of the first air cylinder; a clutch disk supporting a pivoting shaft of the swing arm pivotably and coaxially; a screw member, which is coaxial with the clutch disk, rotated in one body therewith, and screwed into a part of the feed table; and a second air cylinder disposed on the swing arm. A piston of the second air cylinder drives a clutch lever only when the swing arm is pivoted on one side to couple the clutch disk with the swing arm and to make the screw member pivot intermittently. Pitch setting means is disposed, which moves the feed table with a pitch corresponding to a pivot angle of the screw member.

This pitch setting means consists of an eccentric cam member, which limits pivot of the swing arm by bringing a peripheral surface thereof into contact with an end portion of the swing arm. An extent of pivot of the swing arm can be selected arbitrarily by varying the length of cam radius due to pivot of the eccentric cam member. In this way an intermittent feeding pitch of the feed table is set by the pivot angle of the screw member. The eccentric cam member has a polygonal shape, in which distances from a pivot center to different sides forming a peripheral surface are different from each other. One side thereof, which is brought into contact with the swing arm, is selected by stepwise pivot thereof so that the feeding pitch can be set in a stepwise manner.

The means for setting a depth of the key groove consists of a reference block; a guiding member, which guides linearly the reference block in forward and backward directions with respect to the feed table; an appropriate feeding screw capable of moving a position of the reference block relative to the feed table in forward and backward directions; table-shaped supporting means extending parallelly to the feeding screw from a base inserted into the reference block, into which a spindle extending from a micrometer head mounted on the extremity opposite to the base towards the base is freely inserted; a setting block, which is brought into contact with an extremity of the spindle further extending from the base of the tube-shaped supporting means, protruding therefrom and which can advance along the guiding member side by side with the reference block; and a tensile spring stretched between the setting block and the reference block for securing contact of the extremity of the spindle with the setting block. A first and a second sensing member disposed on the reference block and the setting block, respectively, as described above detect a position of an acting member disposed on a lower portion of the feed table. The reference block is positioned at a position, where the first sensing member reacts at a position where cutting of the key groove should be started and the key-seater stops the cutting, when the second sensing member detects the acting member of the feed table, which has moved over a relative separation distance between the reference block and the setting block set by means of the micrometer head.

Further it is preferable that a pushing screw is screwed on an axial line of the spindle from the opposite side of the setting block so that the extremity of the spindle is brought into contact with an extremity of the pushing screw and a distance between the setting block and the reference block can be regulated by varying a depth of coupling by screw of the pushing screw.

Moreover a third sensing member of same kind is disposed separately at a position deviated slightly towards the reference block side with respect to the second sensing member mounted on the setting block. When this third sensing member detects the acting member, a piston of a third air cylinder is made protrude and the pitch of the feeding means is switched over to a certain pitch set at a further smaller value, independently from setting by using the pitch setting means, after a point of time just before the extent of pivot of the swing arm reaches a determined depth of the key groove set by the means for setting a depth of the key groove.

In addition, a bearing having a high capacity for bearing a radial load, which can deal with a heavy charge or a shock-like charge, is disposed as the bearing means for a rotating driving shaft, with which the crank means is linked in one body, and a reduction gear with a hollow outputting shaft having a relatively low capacity for bearing a radial load is used for the reduction gear with a motor. Moreover the cutting tool holder is formed so as to have a particular rectangular cross-section, and a rectangular groove, with which the holder is brought directly into contact to be inserted therein, is formed in a front central portion of the reciprocating table, the holder being secured thereto by using suitable means.

Grinding means regenerating an edge of blade of the cutting tool at a predetermined angle is disposed on a frame supporting the reciprocating table. This grinding means consists of a torus-shaped diamond grinder coupled directly with a motor so as to rotate with a high speed; a stud mounted perpendicularly to a rotation plane of this grinder and an arm supported rotatably by this stud, which is movable along an axial line of this stud so as to be able to be set at an arbitrary position. This arm is provided with a holder, which can hold a grinding plane of the grinder and the axial line of the cutting tool with a predetermined angle therebetween.

BRIEF DESCRIPTION OF THE DRAWINGS

FIG. 11 is a plan view of a work table viewed along a line 10—10 in FIG. 1;

FIG. 14B being a schematical diagram indicating the measuring means for setting a center position of a key groove to be formed including a motor controlling circuit and an arrangement of a starting push button switch; FIG. 14C being a circuit diagram of a circuit for operating the feeding means for moving intermittently the feed table and the means for setting a depth of a key groove; FIG. 14D being a circuit diagram of an air pressure circuit;

DESCRIPTION OF THE PREFERRED EMBODIMENTS

Figure 1:
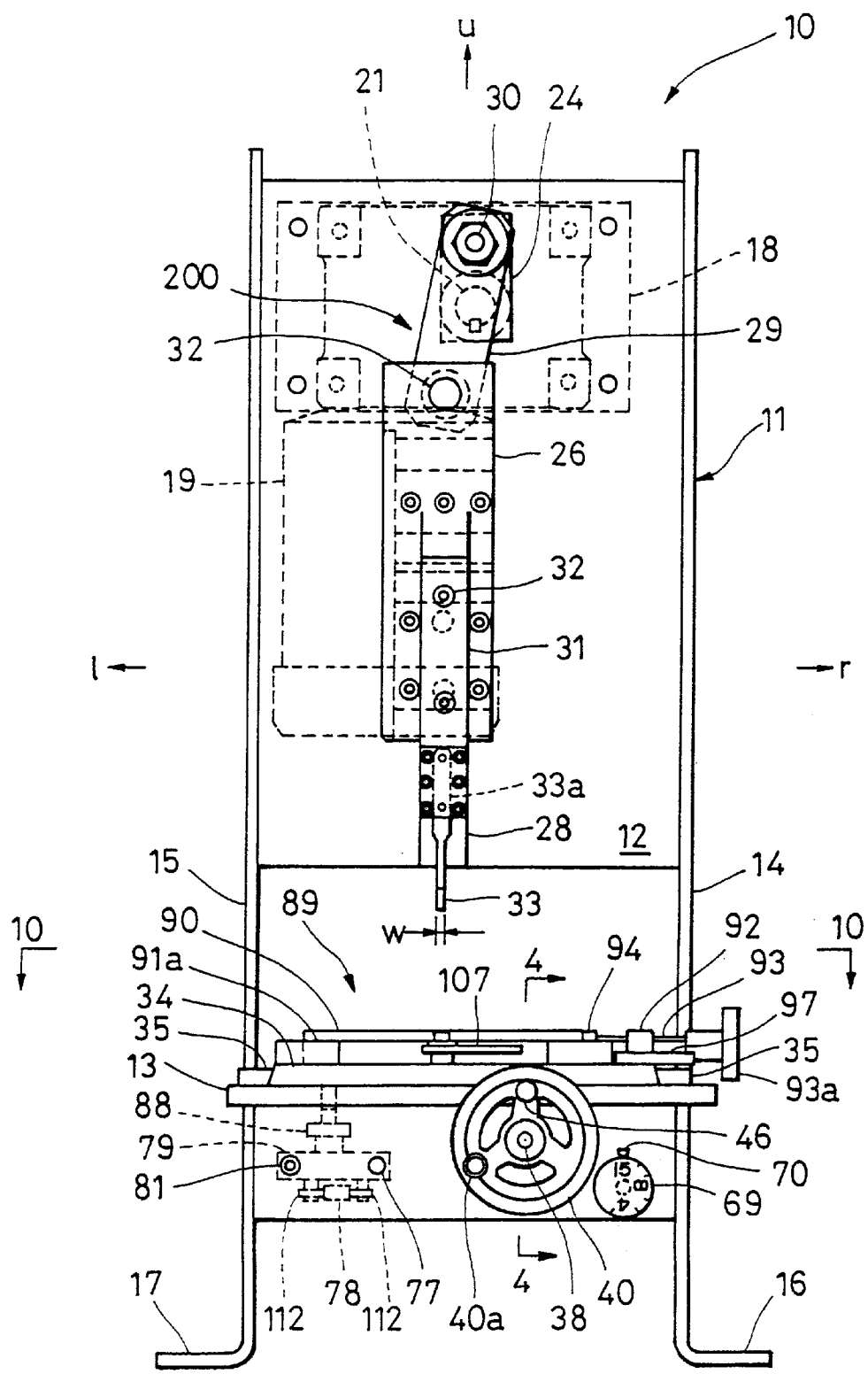
FIG. 1 is a front view of a table-top type key-seater according to the present invention.
Figure 2:
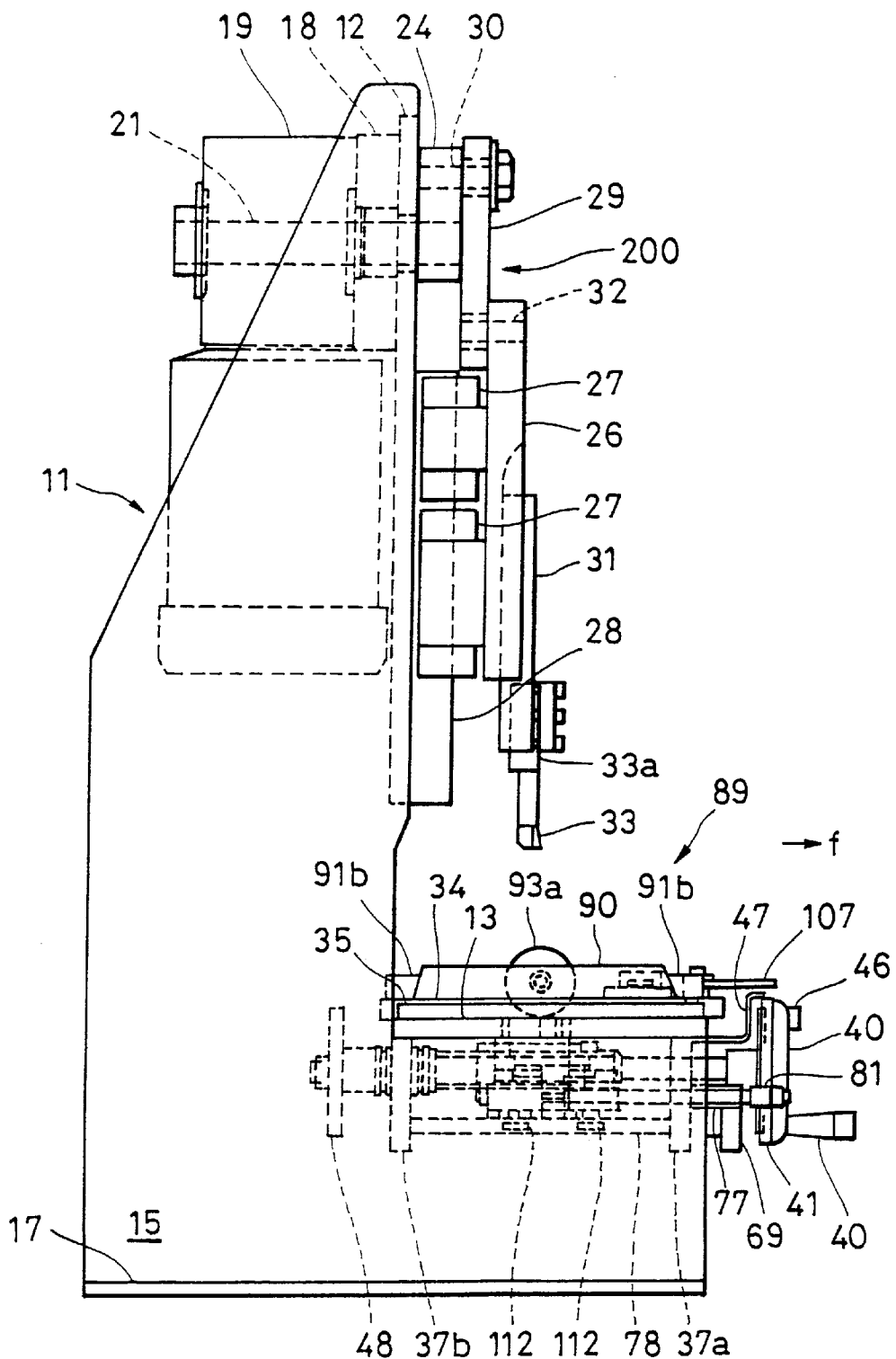
FIG. 2 is a side view of the table-top type key-seater according to the present invention.

Hereinbelow a mode of realization of the table-top type key-seater according to the present invention will be explained, referring to the drawings. FIG. 1 is front view of an embodiment in the whole of the table-top type key-seater (hereinbelow called simply apparatus) and FIG. 2 is a side view thereof. In FIGS. 1 and 2, an arrow u indicates an upward direction of the apparatus; another arrow f a forward direction of the apparatus; a still other arrow r a rightward direction of the apparatus; and a still other arrow l a leftward direction thereof. Reference numeral 11 is a steel frame, which is a construction made by securing a vertical plate 12 and a horizontal table base 13 to left and right side plates 14 and 15 so that they form a right angle. The lower parts of the side plates 14 and 15 are bent outwards so as to form installation seats 16 and 17 for the apparatus 10.

Figure 3:
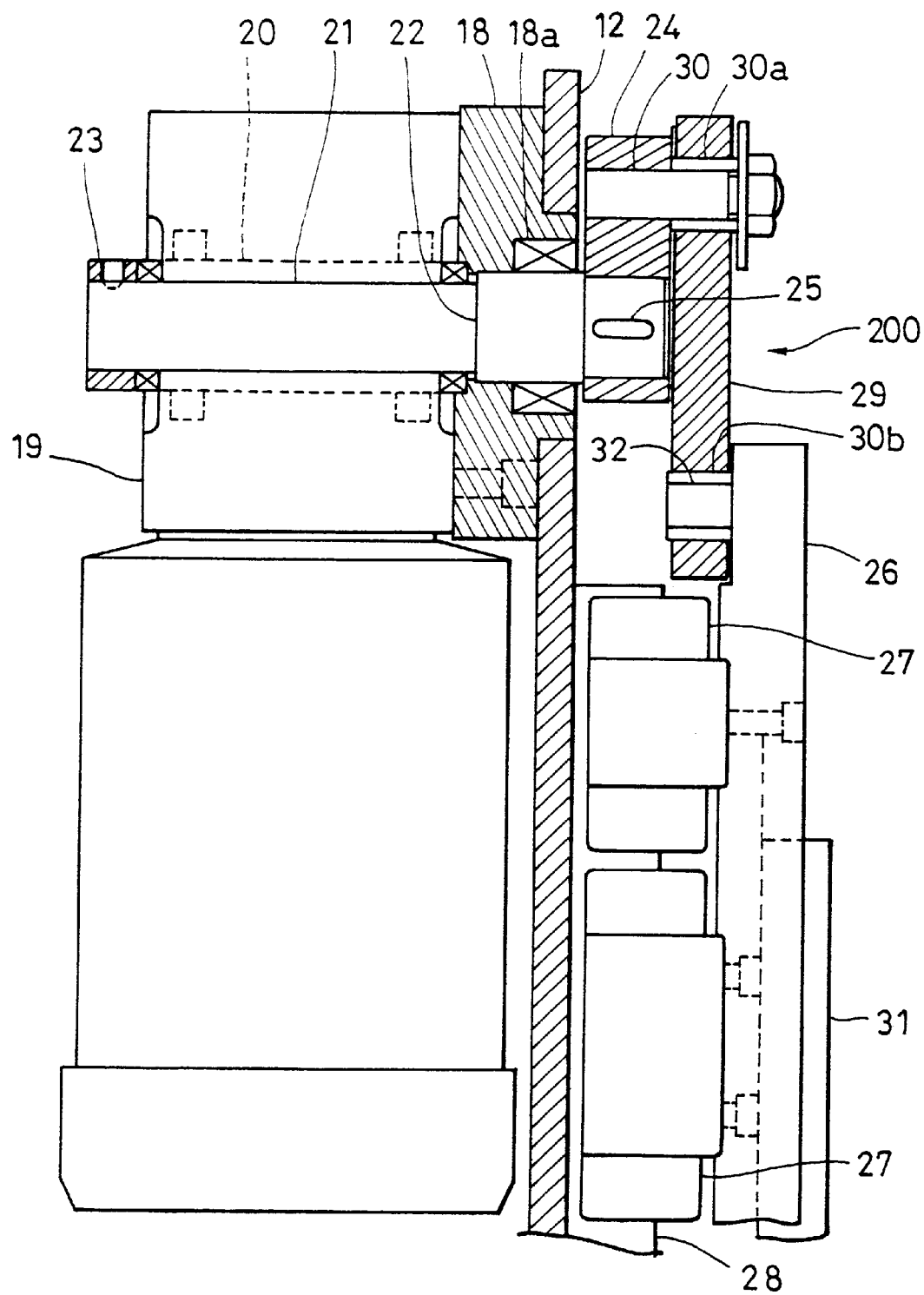
FIG. 3 is a side view indicated partly in cross-section, enlarging a driving section of the table-top type key-seater indicated in FIG. 2 according to the present invention.

A high load radial bearing block 18, which can deal with a heavy charge and a shock-like charge, and a reduction gear with a motor 19 are installed on the rear surface in the upper part of the vertical plate 12. Either of rollers, needles and multi-row balls are used as a rolling bearing member for a high load radial bearing 18a. Further plain metals, sintered alloys, etc. may be used therefor. As indicated in an enlarged scale in FIG. 3, an output shaft 20 of the reduction gear of the reduction gear with a motor 19 is hollow and fitted to the high load radial bearing 18a on a same axial line. A driving shaft 21 is inserted into the hollow part of this output shaft 20 and the high load radial bearing 18a therethrough. Displacement of the driving shaft 21 in the axial direction is prevented by a stepwise portion 22 formed by a difference in the diameter of the shaft between the insertion portion for the hollow part of the driving shaft 21 and the insertion portion for the high load radial bearing 18a and a collar 23 mounted by insertion on the rear end portion of the driving shaft 21.

A crank arm 24 is mounted on the front end portion of the driving shaft 21 while stopping rotation thereof by means of a key 25. 26 is a reciprocating table, which is secured to the rear surface. It is linearly moved smoothly up- and downwards by holding side surfaces of a guide rail 28 secured to a central part of the vertical plate 12 from the two sides by means of a roller bearing unit for planar movement (hereinbelow called simply roller unit). In the present embodiment, in order to move it smoothly, a bearing of double roller circulation type is used therefor, but it may be a linearly sliding guide of alidade groove mechanism. One end of a linking rod 29 for transmitting rotational movement of the crank arm 24 to linear reciprocating movement of the reciprocating table 26 is supported pivotably by a crank pin 30 implanted in the crank arm 24 through a roller bearing 30a, while the other end thereof is supported pivotably by a fixed pin 32 implanted in the reciprocating table 26 through a roller bearing 30b.

Since no repeating excessive load such as a heavy charge, a shock-like charge, etc. is applied directly on the bearing of the reduction gear by juxtaposing the high load radial bearing block 18 and the output shaft 20 of the reduction gear, as described above, it is possible to use a reduction gear of general specification, which is not so designed that it can bear a high radial charge of a varying load by a crank mechanism 200, etc. For the motor in the reduction gear with a motor usually sold in the market a usual general use induction motor can be applied by controlling it by a well-known electronic speed control device 202 (PWM inverter) separately installed and it is possible to realize reduction in cost and saving in space.

In FIGS. 1 and 2, a cutting tool holder 31 is mounted dismountably at the center on the front surface of the reciprocating table 26. The cross-section of the cutting tool holder has a rectangular shape particular to the apparatus and it is so constructed that it is engaged with a groove having a rectangular cross-section disposed at the center on the front surface of the reciprocating table, tightly contacted with side walls thereof so that no gaps are produced on the left and right sides thereof. In this way the position of the cutting tool 33 on a plane is determined with respect to a table base 13 of the apparatus 10, when it is fixed by means of screws.

The cutting tool 33 can be replaced on the cutting tool holder 31 and a blade width w is selected so as to be appropriate for the width of a key to be processed. For this reason the cross-section of a shank 33a of the cutting tool 33 is rectangular so that it is engaged tightly with the rectangular groove formed in the cutting tool holder 31. In this way the cutting tool holder 31 and the cutting tool 33 are fixed to each other so that their axial lines are always matched and the apparatus is so constructed that the blade edge line of the cutting tool 33 is fixed so as to be parallel to the vertical plate 12.

Figure 4:
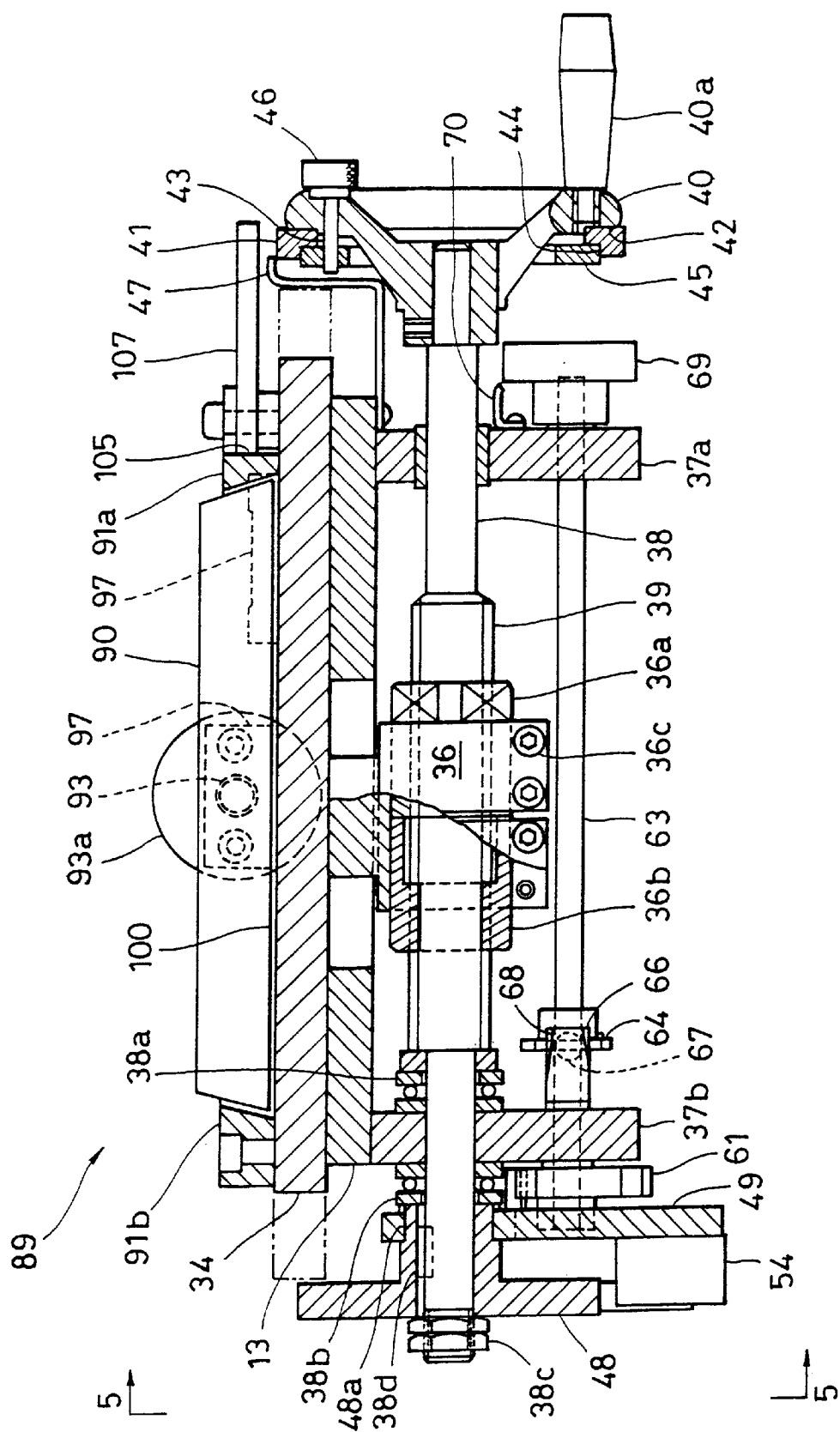
FIG. 4 is a cross-sectional view viewed along a line 4—4 in FIG. 1.

FIG. 4 is a cross-sectional view viewed along a line 4—4 in FIG. 1. A feed table 34 sliding tightly in contact with the upper surface of the table base 13 is guided smoothly only in forward and backward directions without any play, because upward inclined surfaces formed at the edges on the two sides are slidingly in contact with downward inclined surfaces of a forward and backward displacement guide 35 secured to the left and right edges on the two sides of the table base 13 so that up- and downward as well as left- and rightward deviations thereof are prevented (refer to FIG. 1). A feeding shaft 38 supported by brackets 37a and 37b disposed parallelly to the front and the rear surface of the table base 13 under it is held by engaging a female screw bush 36a coupled by screw with a male screw 39 thereof and a double nut 36b with a throughhole with a slit in a screw holder 36 protruding downward formed in one body with the feed table 34.

After having regulated the female screw bush 36a and the double nut 36b so that backlash between two screws is reduced by collaboration thereof with the male screw 39, bolts 36c are tightened in such a direction that the slit of the throughhole is closed. In this way the female screw bush 36a and the double nut 36b are fixed simultaneously at a correct position on the screw holder 36. In this manner it is possible to move manually the feed table 34 forward and backward without any play by rotating a handle 40 mounted on the front end portion of the feeding shaft 38. 40a is a grip of the handle 40.

41 is a graduated ring, on the outer peripheral surface of which graduation having an equal interval corresponding to the pitch of the male screw 39 is notched. The front surface and the inner peripheral surface thereof are slidingly in contact with an outer edge surface 42 and a stepwise portion 43 formed on the handle 41. A stepwise increased diameter portion 44 is formed on the inner side of the graduated ring 41 and a stop ring 45 is mounted rotatably on the increased diameter portion 44. A bolt 46 having a head with indentation on its outer periphery so that it can be tightened and loosened manually is inserted into a throughhole formed in the handle 40 so as to pass therethrough, passes through the inner side of the inner peripheral surface so as not to interfere with the graduated ring 41, and is coupled by screw with the stop ring 45. When the bolt 46 having a manipulation knob is tightened, the graduated ring 41 is tightened between the outer peripheral surface 42 of the handle and the stop ring 45 so that its position relative to the handle 40 is fixed.

47 is a fixed pointer indicating a point in the graduation notched on the outer periphery of the graduated ring 41. For example, when the feed table 34 is displaced by a required distance from a predetermined position, the handle 40 being not moved, the bolt 46 having a manipulation knob is loosened. The graduated ring 41 is freely rotated and the bolt 46 having a manipulation knob 46 is again tightened at the reference position, at which the zero point in the graduation is in accordance with the fixed pointer, so that the graduation ring 41 is fixed to the handle 40 at this position. The feed table 34 can be displaced exactly by a required distance by rotating the handle 40 to a position, where a point corresponding to the required distance is in accordance with the fixed pointer 47, and returned surely to the reference position.

Figure 5:
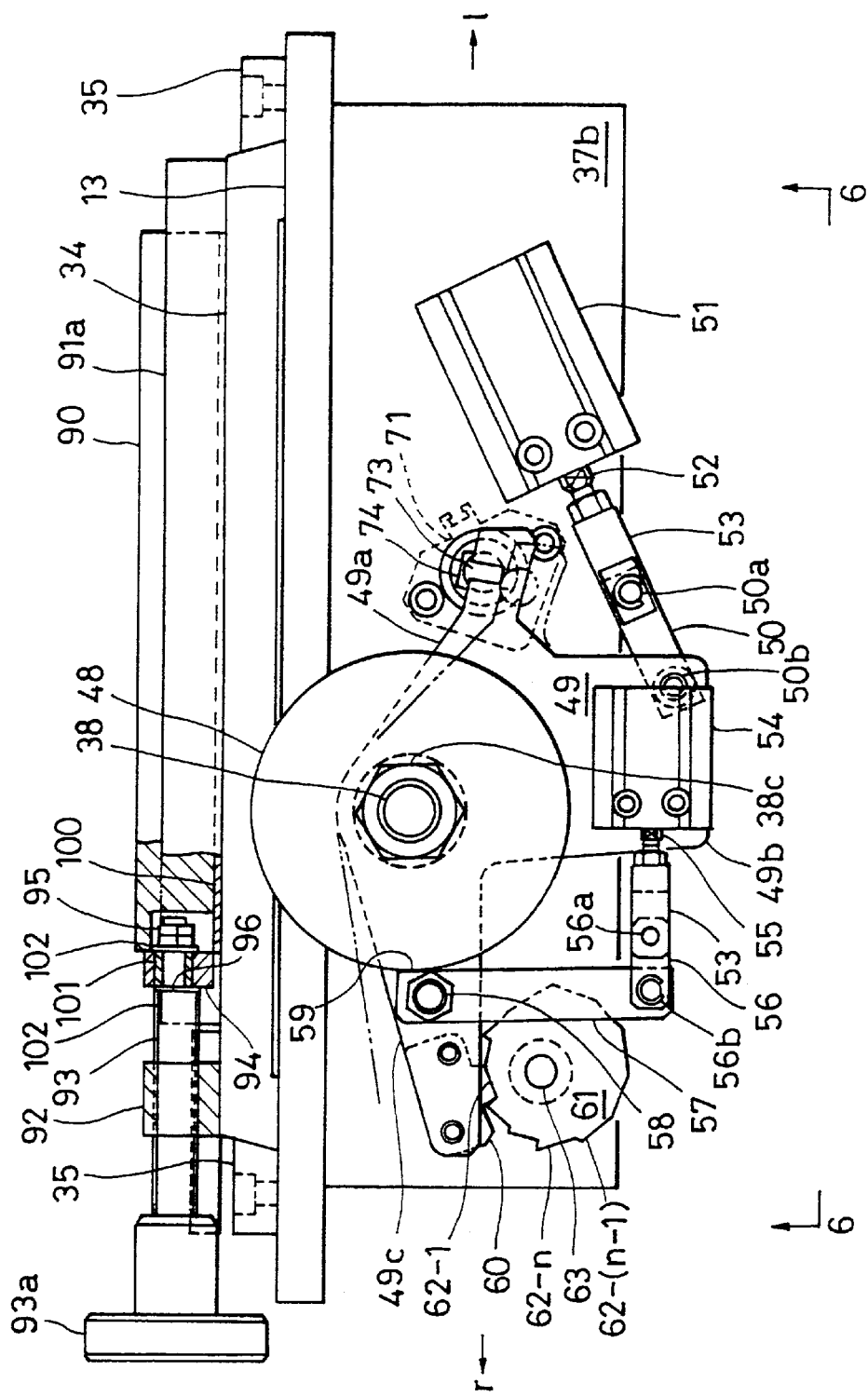
FIG. 5 is an elevation of feeding means for forwarding a feed table viewed from a rear side along a line 5—5 in FIG. 4.
Figure 6:
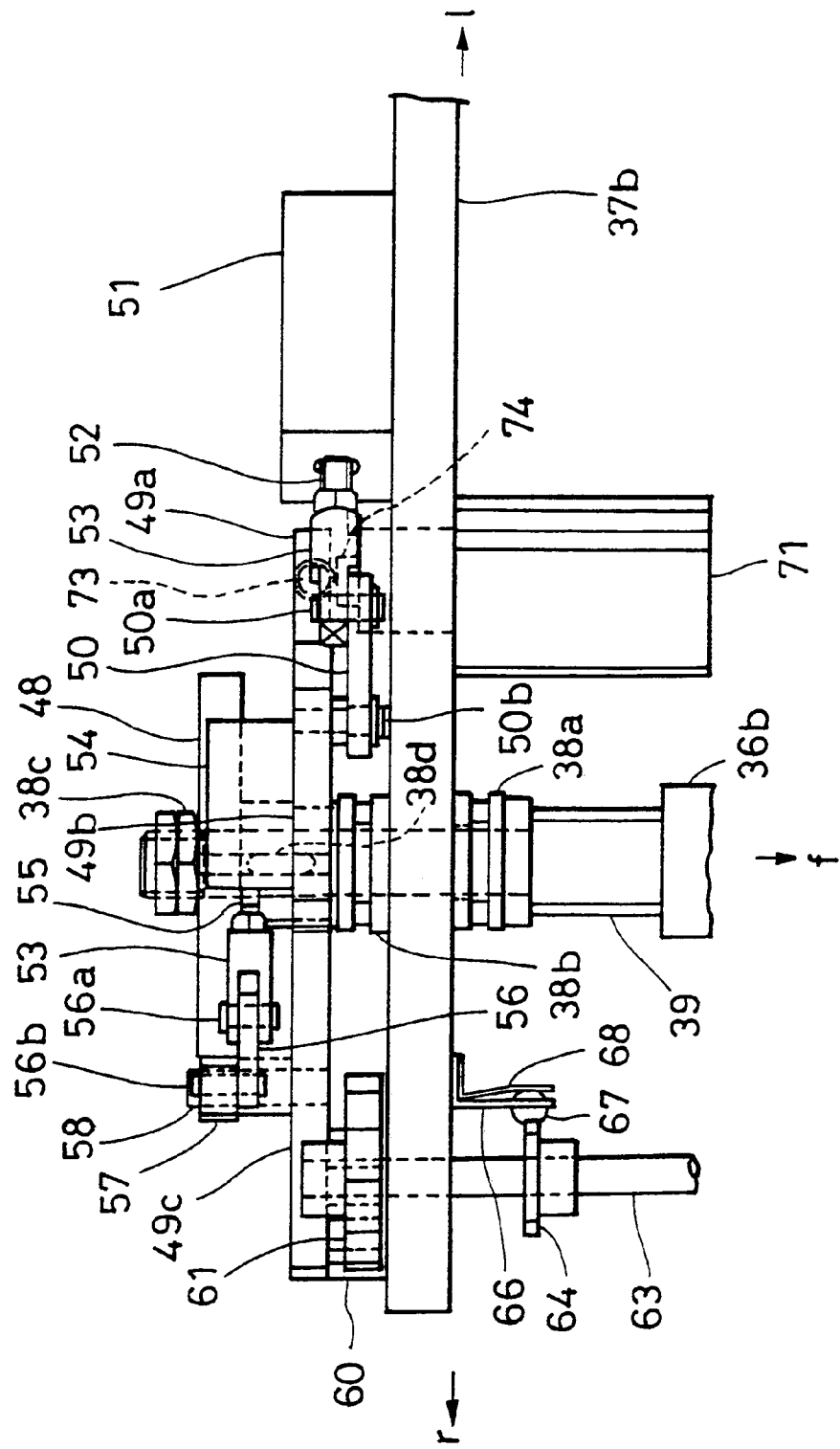
FIG. 6 is a plan view of the feeding means for moving intermittently the feed table viewed from a bottom side along a line 6—6 in FIG. 5.

The feeding shaft 38 is supported rotatably without any play in the axial direction by putting the bracket 37b between thrust bearings 48a and 48b. A clutch disk 48 is secured in the axial direction to the rear end portion of the feeding shaft 38 by means of a nut 38c and it is fixed in the rotation to the feeding shaft 38 by means of a key 38d so that they are rotated in one body. FIG. 5 is an elevation viewed from the rear side along a line 5—5 in FIG. 4 and FIG. 6 is a bottom view viewed from the lower side along a line 6—6 in FIG. 5.

A swing arm 49 is mounted pivotably by inserting a boss 48a of the clutch disk 48 into it (refer to FIG. 4). It is not linked directly with the feeding shaft 38 and provided with arms 49a, 49b and 49c extending in three directions from the pivot center. The second arm 49b of the swing arm is linked with a connecting metal piece 53 mounted on a piston 52 of a stepwise feeding double-acting air cylinder (hereinbelow called simply step cylinder) 51 and extending therefrom so as to be driven in one body therewith through a link 50. The link 50 is pivotable around linking shafts 50a and 50b and makes the swing arm 49 pivot by reciprocating movement of a piston 52 by air pressure control described later.

The second arm 49b is widest among them and an air cylinder for single-acting clutch 54, in which a return spring is integrated, (hereinbelow called simply clutch cylinder) is secured thereto. The clutch cylinder 54 is linked with a clutch lever 57 through a connecting metal piece 53 mounted on a piston 55 and extending therefrom, which is driven in one body therewith, and a link 56. The link 56 is supported pivotably around the linking shafts 56a and 56b and the clutch lever 57 is supported pivotably around a pin 58 implanted in the third arm 49c. A surface contacted with pressure 59, which is close to the outer peripheral surface of the clutch disk 48 in the neighborhood of the pin 58 of the clutch lever 57 and opposite thereto, is contacted with pressure with the peripheral surface of the clutch disk 48 by reciprocating movement of the piston 55 by air pressure control described later. In this way it is coupled therewith by friction and separated therefrom.

Referring to FIG. 5, a sequence of action of the step cylinder 51 and the clutch cylinder 54 will be explained. In a state, where the piston 55 of the clutch cylinder is in a retreated position and the surface 59 contacted with pressure of the step cylinder is not contacted with pressure with the clutch disk 48, when the piston 52 of the step cylinder is protruded by a full stroke, the swing arm 49 is pivoted to the maximum pivot limit in a clockwise direction in the figure. Then, when the piston 55 of the clutch cylinder is extended so that the clutch lever 57 is contacted with pressure with the clutch disk 48 to be engaged therewith and the piston 52 of the step cylinder is retreated, the swing arm 49 pivots in a counterclockwise direction in the figure, linked with the clutch disk 48. By this pivot of the clutch disk 48 the feeding shaft 38 displaces the feed table, which is in one body with a screw holder 46, with which the male screw 39 is coupled by screw, by a pitch corresponding to a rotational angle of the clutch disk 48. The feed table 34 can be moved intermittently in one direction by repetition of this action. In the present embodiment the male screw 39 is constructed by a left-handed screw and the feed table 34 is moved intermittently towards the rear side of the apparatus 10 by this action.

Further, since a contacting plate 60 secured to the extremity portion of the third arm 49c is brought into contact with a cam plate 61, the extent of pivot of the swing arm in the retreating direction of the piston 52 is limited. Since the outer shape of the cam plate 61 is an anomalous polygon, whose sides 62-1 to 62-n are at different distances from the pivot center, and the extent of pivot of the swing arm varies by selecting arbitrarily one of the sides 62-1 to 62-n, with which the cam plate 61 is in contact by pivot, it is possible to set an amount of displacement of the feed table moved by one stroke of the piston 52 of the step cylinder.

Figure 7:
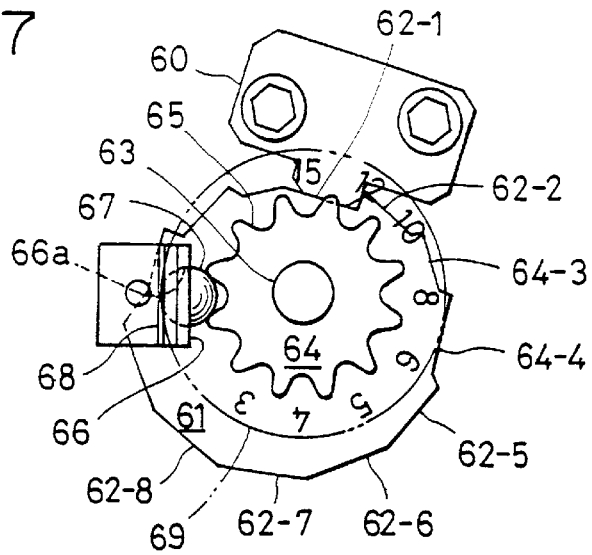
FIG. 7 is an enlarged diagram of a pitch setting section in the feeding means for moving intermittently the feed table of the table-top type key-seater according to the present invention.

As indicated in FIG. 7, a serration 64 pivoting with the cam plate 61 is secured to the pivoting shaft 63 of the cam plate 61 and a steel ball 67 supported by inserting it into a throughhole 66a formed in the bracket 66 is contacted with pressure by an energizing force of a plate spring 68 with one of intervals between teeth 65. Consequently pivot of the cam plate 61 is stopped and stabilized by the steel ball 67 for every interval between teeth 65 of the serration. A relation is set between the serration 66 and the cam plate 61 so that a stop position by the steel ball 67 at one of the intervals between teeth 65 is fitted to a suitable position, where a contacting plate 60 is contacted with a side 62-n of the cam plate 61. In the present embodiment the cam plate 61 is formed by adopting n=8 as an effective number of steps.

The pivoting shaft 63 of the cam plate is supported between the brackets 37a and 37b and a setting dial 69 is secured to an end portion protruding forward. A sign display is effected on the setting dial at a position opposite to an indicating pointer, corresponding to an amount of displacement limited by a side 62 of the cam plate. In the mode of realization in the present embodiment, it is set e.g. so that when the indicating pointer 70 is at a position, to which a sign display "15" corresponds, a side 62-1 corresponds thereto and that the amount of feed at one time of the feed table 34 by one stroke of the piston 52 is 0.15 mm. In the following, similarly thereto, numerals 12 to 3 indicated in FIG. 7 represent 0.12 mm to 0.03 mm, respectively, to which the sides 62-2 to 62-8 correspond. Since decision of selection is direct and easy by adopting a stepwise dial for the setting, time required for the setting can be shortened and design is better.

In the present embodiment, since the pitch of the male screw is 5 mm, when the amount of feed at one time of the feed table 34 is 0.15 mm, the contacting plate 60 of the third arm is brought into contact with the side 62-1 of the cam plate and the pivot angle $\alpha(=360 \times 0.15/5)$ of the swing arm 49 is limited in a region of 10.8°. Further, e.g. when an indicating pointer 70 is at a position, to which a sign display "5" corresponds, the third arm 49c is in contact with the side 62-6 of the cam plate, the pivot angle is limited to 3.6°, and the amount of feed at one time of the feed table 34 is 0.05 mm.

The first arm 49a of the swing arm set a certain region of pivot at a smaller value. Just after the piston 52 has been extended to the greatest stroke position and the swing arm 49 has moved to the limit of the region of pivot, the piston of a stopping single acting air cylinder (hereinbelow called simply stopping cylinder) 71 protrudes. For this reason, the clutch lever 57 is coupled with the clutch disk 48 by action of the piston 55 and the swing arm 49 pivots by the succeeding retreating action of the piston 52. Then, before the contacting plate 60 of the third arm is brought into contact with the cam plate 61, the steel ball 73 buried, protruding slightly only a part of the top portion, in an edge portion of the first arm is brought into contact with a rectangular rod 74 extending at the extremity of the piston of the stopping cylinder 71 so that the returning action is stopped. Consequently the pivot angle of the clutch disk 48 is limited to a further smaller value, e.g. 1.44° and displacement distance of the feed table 34 is 0.02 mm.

Figure 8:
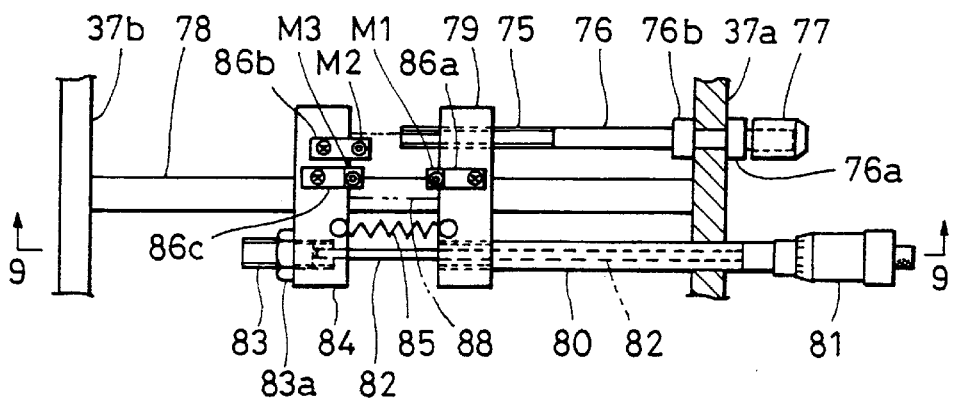
FIG. 8 is a schematical plan view for explaining means for setting a depth of a key groove of the table-top type key-seater according to the present invention.
Figure 9:
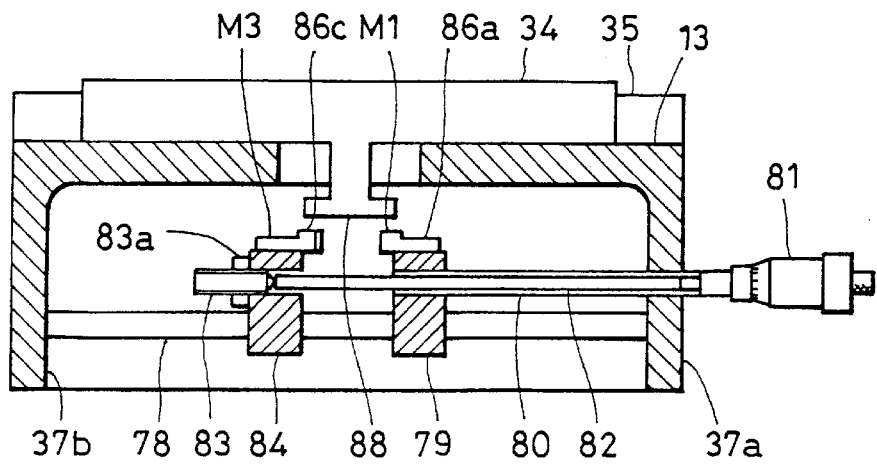
FIG. 9 is a schematical cross-sectional view for explaining the means for setting a depth of a key groove viewed along a line 9—9 in FIG. 8.

FIGS. 8 and 9 are schematical diagrams for explaining key depth setting means, FIG. 8 being a plan view thereof, FIG. 9 being a cross-sectional view of the key depth setting means viewed along a line 9—9 in FIG. 8. 75 indicates an initial position setting means. The rotary shaft 76 thereof is supported rotatably by the font bracket 37*a* and a manual knob 77 is secured to the end portion protruding forward. Movement thereof in the axial direction is prevented by putting the front bracket 37*a* between thrust collars 76*a* and 76*b*. on both the sides. The initial position setting screw 75 is supported rotatably by the front and the rear bracket 37*a* and 37*b* so as to be parallel to the feeding shaft 38 and coupled by screw with one end of a reference block 79 sliding along a linear guide 78. Further the thrust collars 76*a* and 76*b* prevent by friction between the front bracket 37*a* and it that the rotary shaft 76 is rotated easily by unexpected external force such as vibration, etc. Therefore the reference block 79 is never deviated during cutting operation.

A micrometer head 81 is mounted on an outer end portion of a hollow pipe 80, which extends forward, the base thereof being secured to the other end portion of the reference block 79 located on the other side with respect to the linear guide 78, and passes slidably through the front bracket 37*a*. A spindle 82 of the micrometer head 81 is inserted into the pipe 80, protrudes from the reference block 79, and further extends therefrom so that the extremity portion thereof is contacted with pressure with a spherical surface formed at the extremity of a regulating screw 83 coupled by screw with the setting block 84. This energizing force is always produced by tensile force of a spring 85 stretched between the reference block 79 and the setting block 84 and functions so that the contact state with pressure is held, independently from the separation distance between the two blocks.

The regulating screw 83 pushes a surface of a lock nut 83*a* to an outer wall surface of the setting block 84 and in this way it can fix the position thereof. A relative reference position of the setting block 84 with respect to the reference block 79 is regulated and defined at initial setting of the mounting of the apparatus described later. When the manual knob 79 is rotated by fingers, the setting block 84 slides on the same linear guide 78 with the reference block 79, accompanying the micrometer head.

A magnetic sensor 86*a* for setting the initial position is secured to an upper surface of the reference block 79, while another magnetic sensor 86*c* for setting the key depth is secured to an upper surface of the setting block 84. Further a still other magnetic sensor 86*b* for feed switching over is secured to the upper surface of the setting block 84 so that a sensing portion M2 is located, deviated e.g. by 0.2 mm forward from a sensing portion M3 of the magnetic sensor 86*c* (exaggerated in FIG. 8). A rectangular rod 74 of the stopping cylinder 71 is protruded by action of the magnetic sensor 86*b* to limit pivot of the swing arm e.g. to 1.44° and to set displacement distance of the feed table 34 at 0.02 mm. The magnetic sensors 86*a*, 86*b* and 86*c* are arranged so that the respective sensing portions M1, M2 and M3 are located on a same plane parallel to a surface of the feed table 34.

A magnetic base 88 is mounted on a lower part of the feed table 34 so that an acting plane moves along a plane close and parallel to the arrangement surface of the sensing portions M1, M2 and M3 of the magnetic sensors, opposite thereto. The sensing portions 87*a* and 87*c* of the magnetic sensors are initially set at the mounting of the apparatus. For this purpose, reading of the graduation on the micrometer head 81 is set at "0" and the manual knob 77 is manipulated by fingers to displace the reference block 79 so that the sensing portion M1 of the magnetic sensor 86*a* for initial position setting is located at a position, where it responds to the magnet base 88.

Then the lock nut 83*a* is loosened; the regulating screw 83 is regulated; the position of the setting block 84 is finely adjusted to a position, where the sensing portion M3 of the magnetic sensor 86*c* for setting the key depth responds to the magnet base 88; and the lock nut 83*a* is again tightened so that the relationship between the regulating screw 83 and the setting block 84 is fixed. The reference position is a position, where reading of the graduation on the micrometer head is "0" and the sensing portions M1 and M3 of both the magnetic sensors 86*a* and 86*c* respond simultaneously to the magnet base 88. As described above, in the present embodiment, from the point of view that it is sufficient if a position is sensed with a precision of $1/100$ mm, means using magnetic units is adopted. However it is a matter of course that means using light flux and optical sensors or means using a metal piece and approach switches can be used therefor.

Figure 10A:
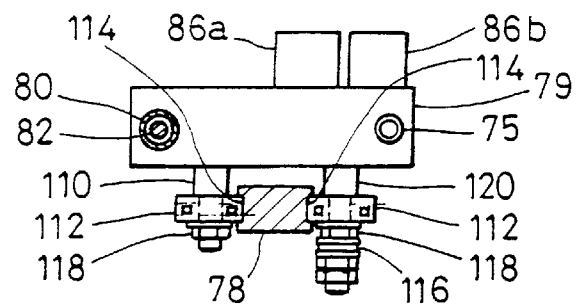
FIGS. 10A and 10B are diagrams showing a linearly guiding mechanism section in the means for setting a depth of a key groove of the table-top type key-seater according to the present invention, FIG. 10A being a cross-sectional view viewed along a line a—a in FIG. 10B, FIG. 10B being a plan view thereof viewed from the bottom side.
Figure 10B:
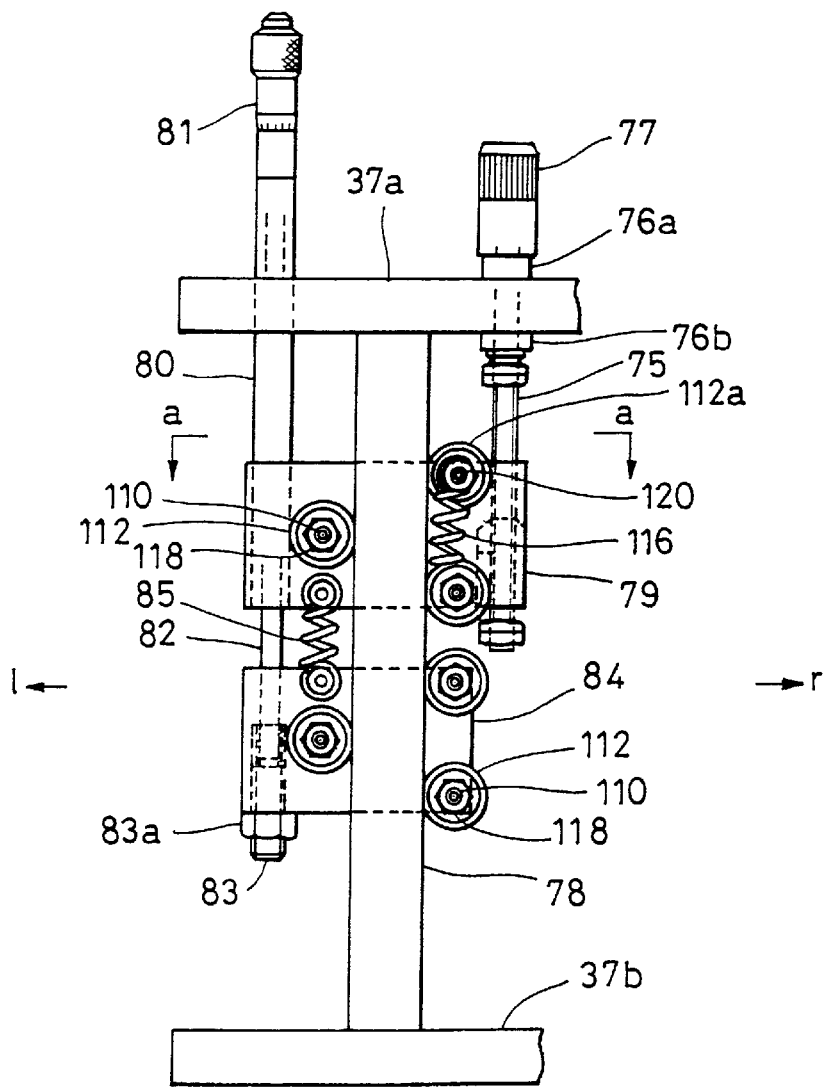

Although the diagrams for explanation indicated in FIGS. 8 and 9 are simplified and the reference block 79 and the setting block 84 are slidingly in contact with the linear guide 78, in the present embodiment, as indicated in FIGS. 10A and 10B, the apparatus is so constructed that outer peripheries of rollers 112 supported rotatably around studs 110 and 120 implanted at three positions on the lower surface of each of the reference block 79 and the setting block 84 are in contact with bottom surfaces 114 of grooves disposed on both the sides of the linear guide 78 so as to put the linear guide 78 therebetween and to support it from both the sides thereof.

Rollers 112 and 112*a* are roller bearings, inner rings of which are tightened by means of screws 118 so as to be secured to the studs 110 and 120. Further, as indicated in Fig. 10B, for stabilizing the setting position of the reference block 79, the stud 120 of a roller 112*a* may be constructed so as to be pivotable in an oblong hole inclined towards the bottom surface of one of the grooves 114 and energized by means of a spring 116 so that the outer periphery of the roller 112*a* is contacted with pressure with the bottom surface 114 of the groove in order to eliminate play therebetween.

FIG. 11 is a plan view of a work table portion 89 moving horizontally left- and rightward, viewed along a line 8—8 in FIG. 5. Displacements of the work table 90 in the up- and downward directions as well as in the forward and backward directions are prevented and it can be guided smoothly only in the left- and rightward directions without any play by making downward inclined surfaces of left- and rightward movement guide 91*a* and 91*b* secured to front and rear edge portions of the upper surface of the feed table 34 slidingly in contact with upward inclined surfaces formed at front and rear edges of the work table 90.

A female screw is formed in a bracket 92 secured to the feed table 34 and a reduced diameter portion at an extremity of a left- and rightward feeding screw 93 engaged therewith by screw is supported rotatably by a side wall 94 of the work table. The side wall 94 is put between a double nut 95 engaged with the extremity of the reduced diameter portion and a reduced diameter step portion 96 and the left- and rightward feeding screw 93 is engaged therewith so that it does not vary in the axial direction with respect to the work table 90 and moreover it is freely rotatable (refer to FIG. 5). A throughhole 90a is disposed as a spill port, where movement path of the cutting tool 33 is not interfered, in the feeding table 34 and the work table 90 within respective regions of movement.

97 indicates a digital length measuring instrument serving as length measuring means, a spindle 98 of which is coupled directly with the work table 90, and an amount of left- and rightward movement of the work table 90 is displayed in a digital manner on a displaying device 99. A scale with vernier or a dial gauge can be used as the length measuring means, depending on processing precision. In order to insulate the work table 90 electrically, an insulating sheat 100 made of FRP such as an epoxy plate containing glass fiber is put between the work table 90 and the feed table 34 (refer to FIG. 4). This insulating sheat 100 has a small coefficient of friction and a resistance to wear. In addition, since nothing slides thereon in a loaded state, it is almost not worn.

Further an insulating bush 101 is inserted into a shaft hole formed in the side wall 94 supporting rotatably the left- and rightward feeding screw 93 and insulating washers 102 are put between the double nut 95 as well as the reduced diameter portion 96 and the side wall 94. The digital length measuring instrument 97 is mounted on the feed table 34 through electrically insulating means. Further there are disposed electric circuit connecting terminals 103 on the side wall 94 of the work table, to which a voltage is applied through lead wires connected thereto (refer to FIGS. 12 and 14).

A left- and rightward movement guide 91a secured to the front edge of the feed table 34, which guide 91a has an elasticity by disposing a thin portion 105 in a central wide extent. 106 is an eccentric cam, with which a lever 107 is formed in one body. It is possible to fix the work table 90 at a predetermined position by bringing the thin portion 105 into contact with pressure with a front edge of the work table 90 by manipulating the lever 107.

Figure 12:
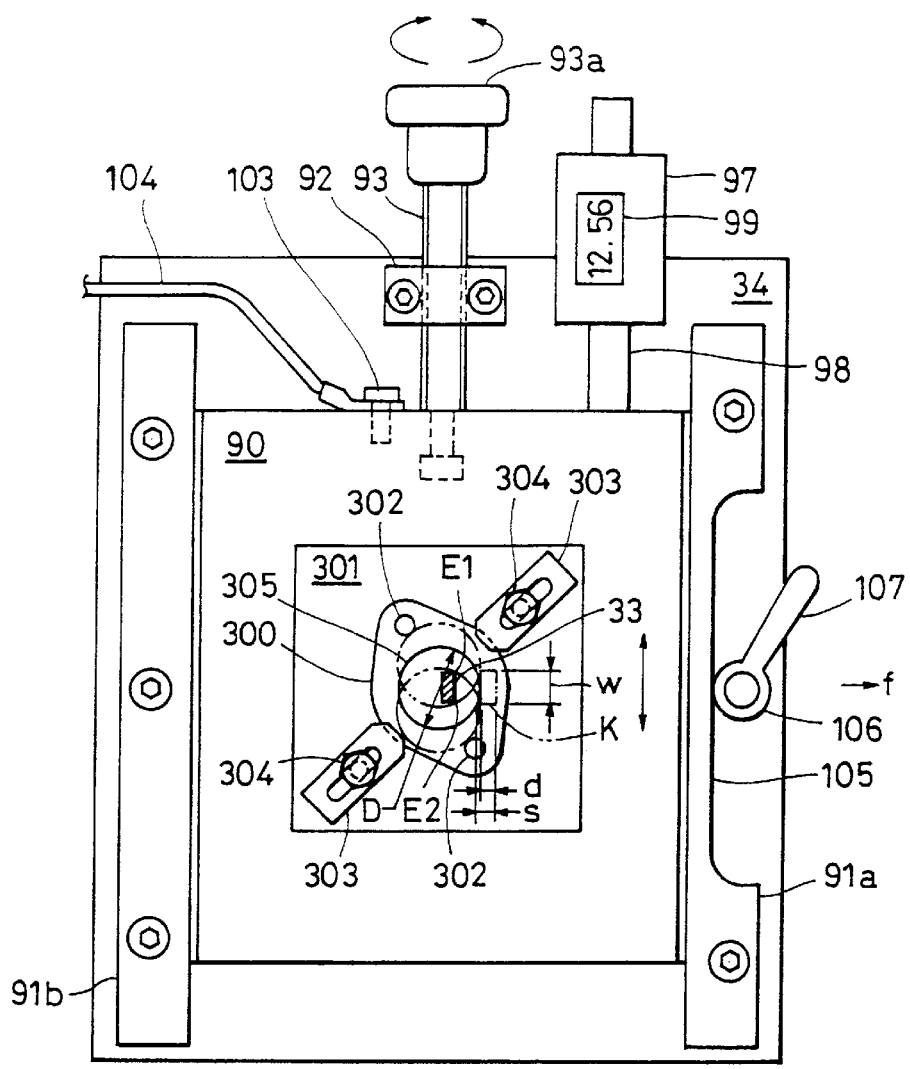
FIG. 12 is a schematical plan view of measuring means for setting a center position of a key groove to be formed in the table-top type key-seater according to the present invention.
Figure 13:
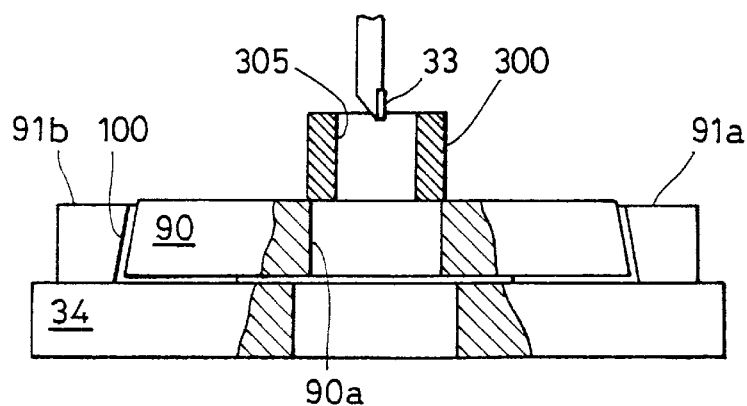
FIG. 13 is a schematical side view, indicated partly in cross-section for explaining the measuring means for setting a center position of a key groove to be formed in the table-top type key-seater according to the present invention.

Next, referring to FIGS. 12 and 13, measuring means for setting a processing center position of the key groove in a table-top type key-seater according to the present invention, i.e. a centering operation, will be explained. In case where processing of a key groove K is effected for a lot consisting of a considerable number of pieces, e.g. a jig 301 capable of fixing a piece to be processed 300, in which a positioning pin 302 is implanted, always at a predetermined position, is set on the work table 90 by using appropriate means. A first piece to be processed is mounted on a predetermined position by using well-known fixing means e.g. in collaboration with a clamping nail 303 and a mounting bolt 304, etc. A cutting tool 33 having a same width of blade w as a key groove to be cut is mounted on a cutting tool holder 31, directing forward the edge of the blade. The lead wires 104 are connected with the electric circuit connecting terminals 103 and a sensing circuit is formed by closing a sensing signal switch SS1 (refer to FIG. 14).

The work table 90 is released by operating the lever 107 so that it can move left- and rightward. The edge of the blade of the cutting tool 33 is lowered little by little to an opening portion of a throughhole 305, in which a key groove should be formed, by operating shortly and intermittently a push button switch PS3. At this time the edge of the blade of the cutting tool 33 is made penetrate into the opening of the throughhole 305 by operating appropriately the handle 40 and the handle 93a of the left- and rightward feeding screw 93 by eye so that the edge of the blade of the cutting tool is not brought into contact with the inner wall of the throughhole 305.

When the work table 90 is moved in one direction by operating the left- and rightward feeding screw 93 and the edge of the blade of the cutting tool is bought into contact with the inner wall of the throughhole 305 to be processed, an operator is informed of an instance of contact by lightening of a lamp L1 or sound of a buzzer B1 (refer to FIGS. 14A to 14D). The operator reads a digital display N1 on the displaying device 99 at a position E1, of which he is informed. The work table 90 is moved in the opposite direction by operating again the left- and rightward feeding screw 93 by means of the handle 93a so that the edge of the blade of the cutting tool 33 is brought into contact with the inner wall on the opposite side of the throughhole 305 and the operator reads another digital display N2 on the displaying device 99 at a position E2, for which he has seen lightening of the lamp L1 or received an acoustic signal from the buzzer B1 informing him of the contact.

(N1+N2)/2=N is calculated and the work table 90 is moved to a position corresponding to an indication N of the displaying device 99 by operating the left- and rightward feeding screw 93. The work table 90 is fixed by means of the eccentric cam 106 by operating the lever 107. Centering of the setting jig 302 with respect to the cutting tool 33 is terminated by this simple operation. Since left- and rightward movements of the work table 90 is prevented by the lever 107, it is possible to form the key groove K always at a same position by clamping the piece to be processed 300 at a same position, using the positioning pin 302 of the setting jig 301.

Figure 14A:
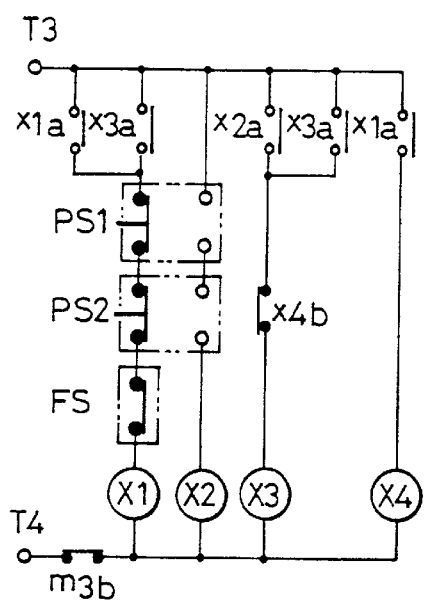
FIGS. 14A, 14B, 14C and 14D are block diagrams of an embodiment for explaining a controlling mechanism in the table-top type key-seater according to the present invention, FIG. 14A being a circuit diagram of a starting relay circuit.
Figure 14B:
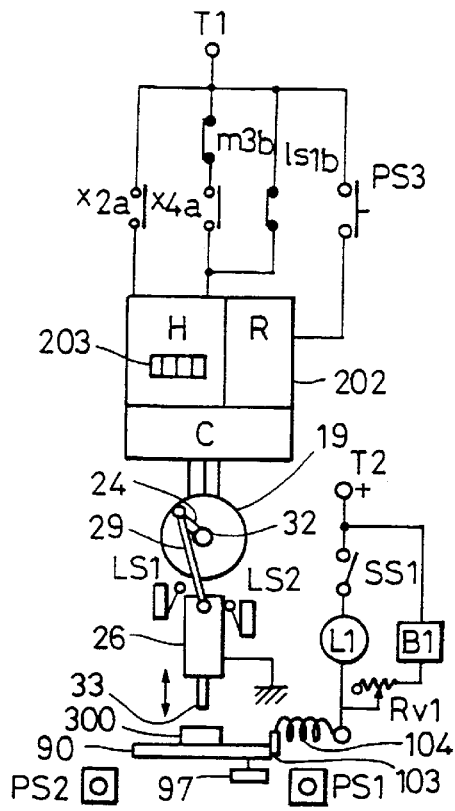
Figure 14C:
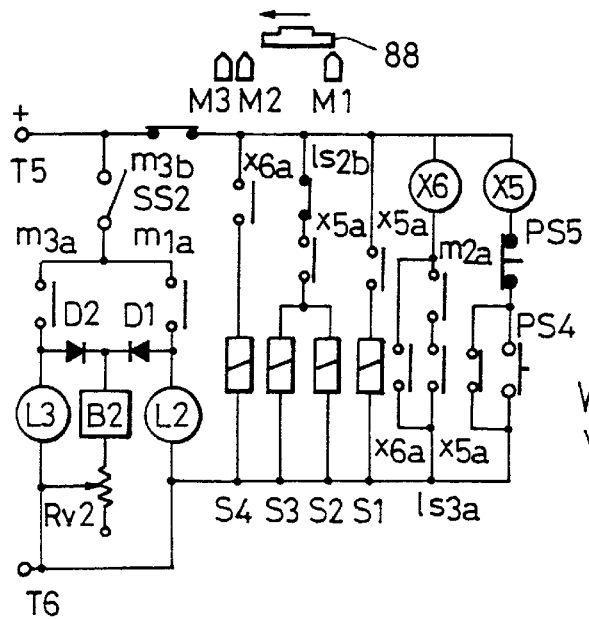
Figure 14D:
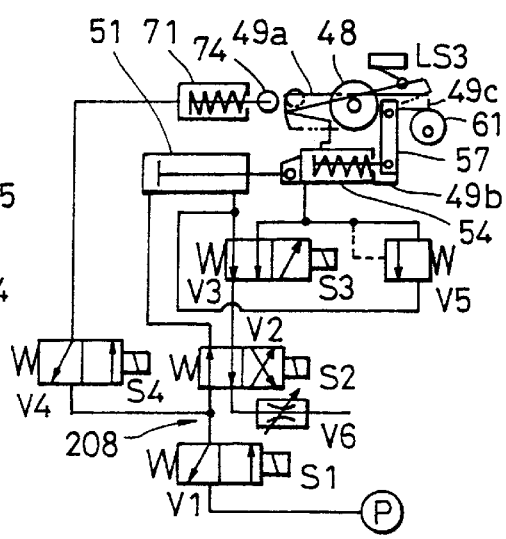

FIGS. 14A to 14D show an embodiment indicated in block diagrams for explaining a fundamental controlling mechanism for the table-top type key-seater according to the present invention, but the present invention is not restricted thereto. FIG. 14A indicates a starting relay circuit; FIG. 14B is a schematical diagram showing the measuring means for setting the processing center position, including an arrangement of a motor controlling circuit and a starting push button switch; FIG. 14C represents a circuit for operating the intermittent feeding means for the feed table and the means for setting the key groove depth; and FIG. 14D shows the air pressure circuit. Input terminals T1 to T6 are connected with suitable output terminals of a power supply device not indicated in the figures. PS1 and PS2 in the starting relay circuit in FIG. 14A are push button type starting switches on both the sides of the work table 90, as indicated in FIG. 14B. The reduction gear with a motor 19 (hereinbelow called simply motor) is so constructed that it is started, only when the push button PS1 and PS2 are pushed simultaneously by means of the two hands, and that the motor 19, which has been once started, is stopped momentarily by operating only either one of the push buttons. Further a switch FS of tread type with a foot is disposed separately as a momentarily stopping switch, in order to assure security.

In the drawing of FIG. 14B, the speed of the motor can be varied by selecting a cutting speed suitable for material and feed pitch e.g. by means of a push type selection switch 203 in a variable speed control circuit H of a well-known PWM (pulse width modulation method) inventer 202. Further a push button type switch PS3 is connected with a low speed control circuit R and the driving speed of the motor 19 is switched over automatically to a predetermined low speed. During the whole time the push button is pushed, the motor is driven at the low speed and when the push button is released, the motor 19 is momentarily stopped by a braking circuit C. Further the braking circuit C is so programmed that the motor 19 is momentarily stopped also by the fact that a contact m3b or 1s1b is opened by a stopping signal from a limit switch LS1, which is at the highest position of the sensing portion M3 of the magnetic sensor and the reciprocating table 26.

As described above, the lead wires 104 are connected with the terminals 103 of the work table; the cutting tool 33 is guided into the throughhole 305 in the piece to be processed 300 by operating shortly and intermittently the switch PS3; and the center position of the key groove processing in the piece to be processed 300 is set with respect to the cutting tool 33 by effecting the centering operation for the cutting tool 33 for processing the key groove K by closing the sensing signal switch SS1, based on an indication on the displaying device 99 corresponding to a signal of the lamp L1 and/or the buzzer B1 due to the contact of the cutting tool 33 with the piece to be processed 300. A variable resistor Rv1 is used for regulating the sound intensity. Either both the lamp L1 and the buzzer B1 or only the lamp L1, the variable resistor Rv1 for regulating the sound intensity of the buzzer B1 being switched off, can be used. After termination of the setting operation the sensing signal switch SS1 is opened.

When a feeding operation switch PS4 in the operating circuit indicated in FIG. 14C is pushed, a relay X5 is self-held and all contacts x5a are closed. A solenoid S1 in the air pressure circuit indicated in FIG. 14D is excited so that a switching valve V1 is opened and pressure from a pressure source P is supplied to the air pressure circuit 208. At this time, when the reciprocating table 26 is at an elevated position and engaged with the limit switch LS2, a contact 1s2b is on the open side and switching valves V2 and V3 are at no-excitation positions indicated in the drawing. At this time, the piston 55 of the clutch cylinder 54 is at a retreated position and the piston 52 of the step cylinder 51 is extended in a state where the coupling between the clutch lever 57 and the clutch disk 48 remains removed so that the swing arm 49 is pivoted to the greatest amplitude.

As far as the reciprocating table 26 holds engagement with the limit switch LS2 at the elevated position, the swing arm 46 and the clutch lever 57 hold their position and since the clutch disk 48 is not restricted, it is possible to move forward and backward the work table 90 by operating manually and freely the handle 40.

When the reciprocating table 26 is lowered and engagement of the limit switch LS2 is removed to be closed, the solenoids S2 and S3 are transferred simultaneously to excitation positions, the switching-over valves V2 and V3 are switched over, and the clutch cylinder 54 extends its piston 55 so that the clutch lever 57 is contacted with pressure with the outer periphery of the clutch disk 48 to be coupled therewith by friction. When pressure within the clutch cylinder 54 rises to a value, at which a satisfactory coupling can be obtained, a sequence valve V5 acts and the piston 52 of the step cylinder 51 is retreated.

By this action, the swing arm 49 pivots the clutch disk 48 together therewith to the greatest angle limited by the cam plate 61 of the pitch setting means and the feed table 34 is sent backward by a pitch corresponding to this angle to stop there. The program is so prepared that this displacement of the feed table 34 is terminated, before the cutting tool 33 is lowered so that it is brought into contact with the piece to be processed 300, and this state is held, until the reciprocating table 26 rises to be engaged with the limit switch LS2. During this period of time, since the clutch disk 48 is in a locked state, the feed table 34 is never displaced in the processing stroke, until the reciprocating table 26 cuts the key groove K and is separated from the piece to be processed.

Before the feeding action switch PS4 is operated, the switching-over valve V1 is in a closed position and the clutch disk 48 is not restricted so that the handle 40 can be freely operated. Therefore the sensing signal switch SS1 is closed; the work table 90 is moved manually to a rear part of the apparatus; a cutting tool 33 is brought into contact to the wall surface on the near side of the throughhole 305, where a key groove K should be formed; and an informing signal of the lamp L1 and/or the buzzer B1 is verified. This is a position where cutting of the key groove K should be started. The sensing signal switch SS1 is opened and the graduated ring 41 appendant to the handle 40 is rotated without rotating the latter and fixed at a position where the fixed pointer 47 is e.g. at a graduation "0" by means of the bolt 46 having a head with indentation on its outer periphery so that it can be tightened and loosened manually so as to obtain a mark representing the cutting start position.

The cutting length s from the cutting start position for the key groove K to the bottom of the key groove K is a function of a diameter D of the throughhole 305 and a width w of the key groove K and it is not in accordance with a design depth d of the key groove K. Consequently a cutting length s necessary for obtaining a required depth d of the key depth K is obtained by using a suitable calculation formula:

$$s=(D/2)\cdot[1-\{(1-(W/D)2\}1/2]+d$$

or a numerical table. The graduation of the micrometer head 81 is adjusted to the required cutting length s. Then the cutting start position setting switch SS2 is closed and the initial position setting screw 75 is moved by operating the manual knob 77 to displace the magnetic sensor 86a. When the sensing portion M1 of the magnetic sensor 86a is displaced to a position where an action point of the magnet base 88 is sensed, the contact m1a is closed and an informing signal is issued from the lamp L2 and/or the buzzer B2. By this operation, a cutting termination position for the required depth of the key groove is set, based on the cutting start position for the key groove K.

When the feed table 34 is displaced and reaches the cutting termination position, the sensing portion M3 of the magnetic sensor 86c responds thereto so that the contact m3a is closed and the lamp L3 is lightened. At the same time, the contact m3b of the circuit indicated in FIG. 14B is opened and the circuit for driving the motor 19 consists only of the contact 1s1b of the limit switch LS1. The contact 1s1b is opened by the fact that the reciprocating table 26 rises to the highest position and is engaged with the limit switch LS1, and the motor is stopped. Further, since the contact m3b is opened, the start relay circuit indicated in FIG. 14A returns to its initial state. Consequently the sensing portion M3 stops the response and the start relay circuit is transferred to its initial state, where it is separated from the magnet base, so that the contact m3b is closed and it does not function before the starting switches PS1 and PS2 are operated in the next time.

At the position where the graduation of the micrometer head 81 is "0", when the sensing portion M1 of the magnetic sensor 86a responds at the corresponding acting point of the magnet base 88, the sensing portion M3 of the magnetic sensor 86c responds also at the same time at the corresponding acting point of the magnet base 88. At this time, since both the contacts m1a and m3a are closed and two lamps L2 and L3 are lightened at the same time, it is possible to examine whether the graduation "0" of the micrometer head 81 and the positional relationship between the sensing portion M1 and the sensing portion M3 are exactly maintained or not. The buzzer B2 functions for either one of the informing signals. However, similarly to the buzzer B1, it is possible also to use only the lamps L2 and L3, switching-off the variable resistor Rv2 for regulating the sound intensity. The buzzer B2 is used in common by constructing the circuit so that the circuits for the lamps L2 and L3 do not interfere mutually by using diodes D1 and D2.

Next the cam plate 61 is pivoted stepwise by operating the setting dial 69 for setting the feeding pitch so that the indicating pointer 70 is on a numeral indicating a required pitch. The starting switches PS1 and PS2 are opened simultaneously by two hands to excite the relay X2. When the contact x2a indicated in FIG. 14B is closed to start the motor 19, engagement of the reciprocating table 26 with the limit switch LS1 is removed and the circuit from the contact 1s1b becomes conductive. Since the relay X3 is self-held and the contact x3a of the relay X1 is closed, when both the starting switches PS1 and PS2 return to contacts b, the relay X1 is self-held and the relay X4 is excited.

The contact x2a of the circuit indicated in FIG. 14B is conductive only in a period of time where the relay X2 is excited. However thereafter the circuits of the contacts m3b and x4a maintain conducting states so that the motor 19 rotates continuously and that the reciprocating table 26 repeats rising and descending movements to effect the key groove processing. After that, when the starting switches PS1 and PS2 are pushed, self-holding of the relay X1 is removed. Since excitation of the relay X4 is also removed, the reciprocating table 26 is engaged with the limit switch LS1; the contact 1s1b is opened; and the motor 19 is stopped. The highest rise position, at which the motor 19 is stopped, is the stop position. Moreover, even if the foot switch FS is opened, a similar action is effected also by opening the contact m3b of the sensing portion M3 of the magnetic sensor described above and the reciprocating table 26 stops always at the highest rise position.

Then, when the feeding action switch PS4 indicated in FIG. 14C is pushed, the relay X5 is self-held and when the stopping switch PS5 is pushed, the self-holding is removed. Since the solenoid S1 acts to open the switching-over valve V1 by excitation of the relay X5, air pressure is sent to the air pressure circuit 208 as described previously and the contact 1s2b of the limit switch LS2 repeats opening and closing actions, interlocked with the rising and descending action of the reciprocating table 26. In this way the solenoids S2 and S3 repeat switching-over action of the switching-over valves V2 and V3 at the same time, which drive cylinders 54 and 51 successively in an order controlled by the sequence valve V5. The work table 90 begins intermittent feed with a pitch set by the cam plate 61 towards the rear side of the apparatus to effect cutting of the key groove K.

The contact m2a of the relay X6 is closed by the sensing portion M2 of the magnetic sensor 86b, which has sensed the action point of the magnet base 88 at 0.2 mm before the sensing portion M3 of the magnetic sensor 86c sensing at the predetermined depth d of the key groove, so that a waiting state is realized. When the swing arm 49c reaches the greatest stroke and is engaged with the limit switch LS3, as indicated in FIG. 14D, since the contact 1s3a of the relay X6 is closed, the relay X6 is transferred to a self-holding state. The solenoid S4 is excited to open the valve V4 and drives a stopping cylinder 71. A rod 74 at the extremity of an extended piston enters pivot path of the first arm 49a of the swing arm; the returning stroke of the swing arm is reduced to a certain further smaller region; and the feeding pitch, i.e. the amount of cutting of the work table 90 is switched-over to a restricted finishing cutting of 0.02 mm.

When the sensing portion M3 of the magnetic sensor 86c sensing at the predetermined depth d of the key groove has sensed the action point of the magnet base 88, the contact m3b of the circuit for driving the motor 19 is opened and the circuit for driving the motor 19 consists only of the contact 1s1b. Since the circuits including the contact m3b indicated in FIGS. 14A and 14C are released also at the same time, the starting relay circuit returns to its initial state and excitation of the solenoid S1 is removed so that the air pressure circuit 208 is closed. The motor 19 continues further to rotate and the reciprocating table 26 opens the contact 1s1b at the highest rise position, where it is engaged always with the limit switch LS1. Therefore conduction of the circuit for driving the motor 19 is interrupted and the motor is stopped. Errors in the depth of the key groove K never exceeds 0.02 mm owing to finishing cutting, for which the feeding pitch is restricted to 0.02 mm.

Since the reciprocating table 26 is at the elevated position and the clutch lever 57 is not contacted with the clutch disk 48 by the clutch cylinder 54, the work table can be displaced towards this side by manipulating freely the handle 40 so that the work table 90 is displaced to a position, where the cutting tool 33 is satisfactorily separated from the inner wall surface of the piece to be processed 300, beyond the position where the sensing portion M1 of the magnetic sensor 86a responds to the magnet base 88.

The piece to be processed 300, for which processing for forming the key groove has terminated, is dismounted; another piece to be processed 300 not yet processed is fixed at a predetermined position, and the handle 40 is again operated so that the fixed indicating pointer 47 is at the graduation "0" of the graduated ring 41. In this way the work table 90 is positioned at the cutting starting position. Since centering of the cutting tool 33 and the piece to be processed 300 is already secured by the first setting and the processing depths of the key groove K is set by the micrometer head 81, it is possible to start key groove processing for the new piece to be processed 300 by pushing the starting switches PS1 and PS2. All the processings can be effected by using a CPU, replacing all the electric circuit by a microcomputer.

Figure 15:
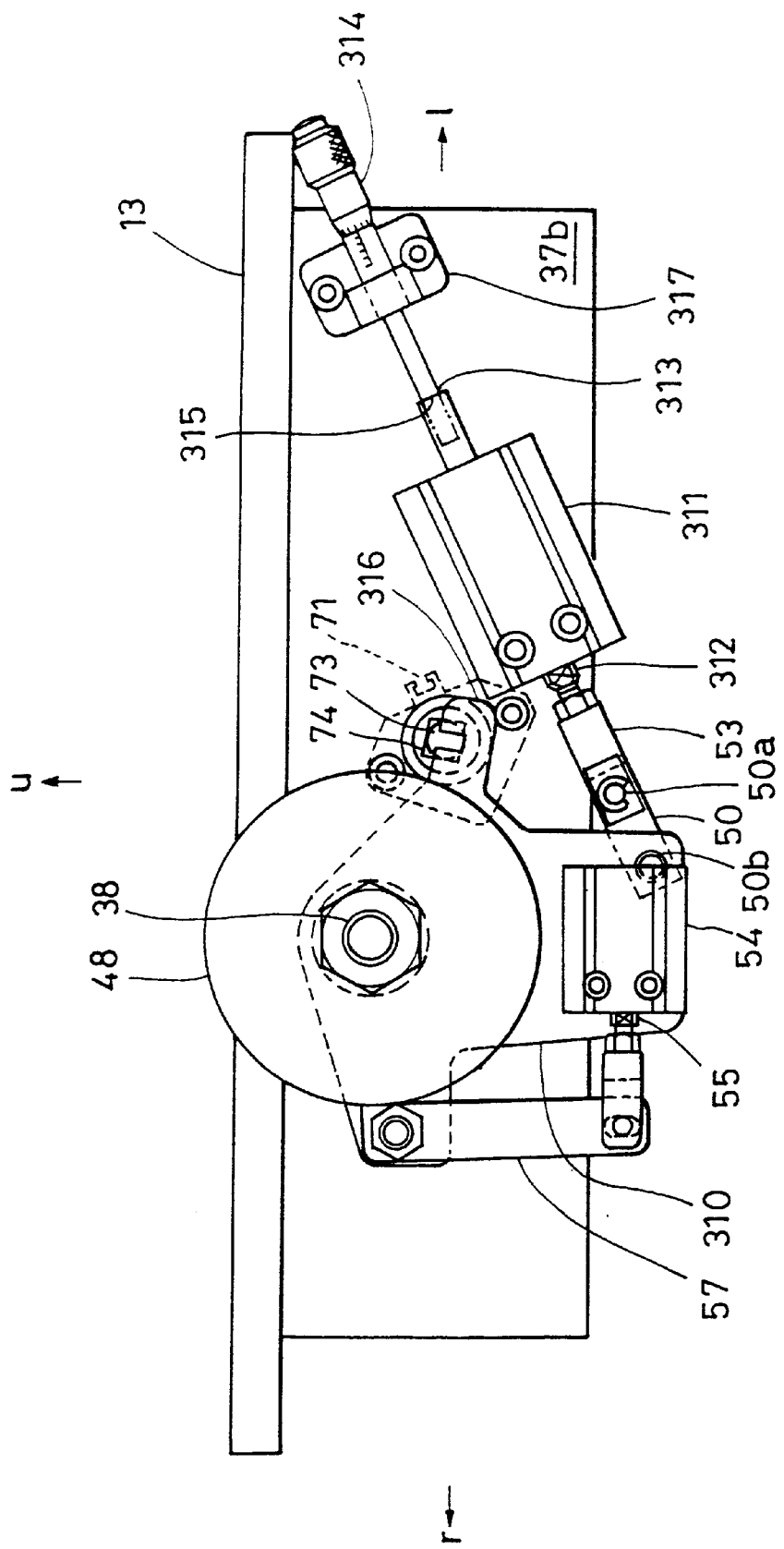
FIG. 15 is an elevation, viewed from the rear side, indicating another embodiment, similarly to FIG. 5, of the feeding means for moving intermittently the feed table in the table-top type key-seater according to the present invention.

Now a second embodiment, which is another mode of realization of the intermittent displacement means of the feed table 34, will be explained, referring to FIG. 15. All the members identical to those described for the first embodiment are indicated by the same reference numerals. The construction, in which the swing arm 310, on which the clutch cylinder 54 is mounted, is supported pivotably coaxially to the feeding shaft 38 and the clutch lever 57 is contacted with pressure with the clutch disk 48 by the piston 55 extending from the single-acting spring-back type clutch cylinder 54 so that they are coupled with each other by friction, and the construction, in which a connecting metal piece 53 is mounted at the extremity of the piston 312 of the step cylinder 311 and linked with the swing arm 310 through the link 50 so that the swing arm 310 is pivoted by extension and contraction of the piston 312 are completely identical to those described in the embodiment of the swing arm 49 in the first mode of realization explained previously.

A double-acting step cylinder 311 used in this second embodiment is one of double rod type, in which a piston 312 extends on the front and rear sides of a cylinder, and a rear end surface 313 of the piston 312, which is opposite to that described above, is parallel to a front end surface 315 of a spindle of a micrometer head 314 held on the rear bracket 37b by means of a holding metal piece 317 and stands face to face therewith. Consequently, when the step cylinder 311 acts in a direction, in which the piston is retreated, the rear end surface 313 of the piston 312 is brought into contact with the front end surface 315 of the spindle of the micrometer head so that displacement thereof is prevented and therefore the stroke is limited.

Now movement of this swing arm 310 will be explained. At first, the clutch cylinder 54 acts; the piston extends; and the clutch disk 48 is restricted by coupling with the clutch lever 57 by friction. Next, the piston 312 of the step cylinder 311 is extended to the limit of the stroke and the swing arm 310 pivots to the greatest pivot angle together with the clutch disk 48 to wait in this state. Thereafter the clutch cylinder 54 retreats the piston 52 so that the clutch disk 48 is released from the clutch lever 57 and on the other hand the step cylinder 312 retreats the piston 312 to a position, in which the rear end surface 313 thereof is brought into contact with the front end surface 315 of the spindle of the micrometer head. In this way one stroke is terminated.

When extension and contraction of the piston 312 are repeated by the step cylinder 311, the feed table 34 is moved intermittently with a pitch corresponding to the pivot angle of the swing arm 310. It is possible to set arbitrarily a region of pivot of the swing arm 310 so that the feed table 34 moves with a predetermined pitch by varying continuously in a region indicated by an alternate long and two short dashes line indicating the position of the front end surface 315 of the spindle by manipulating the micrometer head.

Further the sensing portion M2 of the magnetic sensor 86b responds before the cutting finishing position and the stopping cylinder 71 is driven by this signal. In this way, it is possible to effect finishing cutting by restricting the region of pivot of the swing arm 310 to switch over to a finer pitch by preventing movement of the arm 316 at a predetermined position, independently from the position of the front end surface 315 of the spindle of the micrometer head by extending the piston 72.

The male screw 39 of the feeding shaft 38 being a right-handed screw, it is possible to move the feed table 34 towards the rear part of the apparatus, similarly to the first embodiment described previously by rotating intermittently clockwise the clutch disk 48. Either combination can be applied by relating the direction of the screw to the intermittent feed action.

Figure 16A:
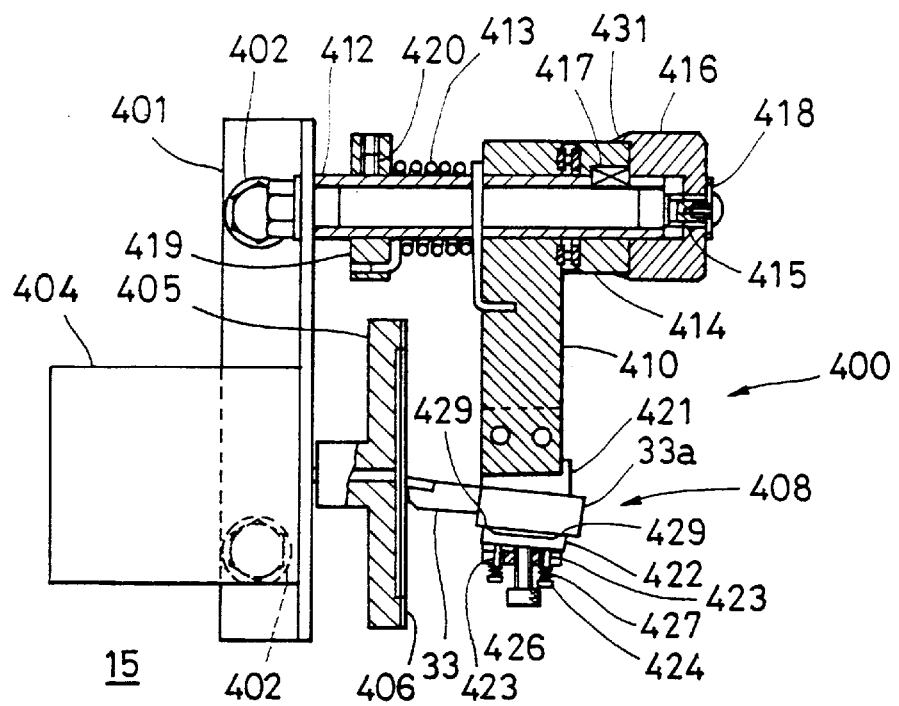
FIGS. 16A and 16B are diagrams showing an outline of an apparatus for grinding an edge of blade of a cutting tool in the table-top type key-seater according to the present invention, FIG. 16A being a side view thereof, indicated partly in cross-section, FIG. 16B being a front view thereof.
Figure 16B:
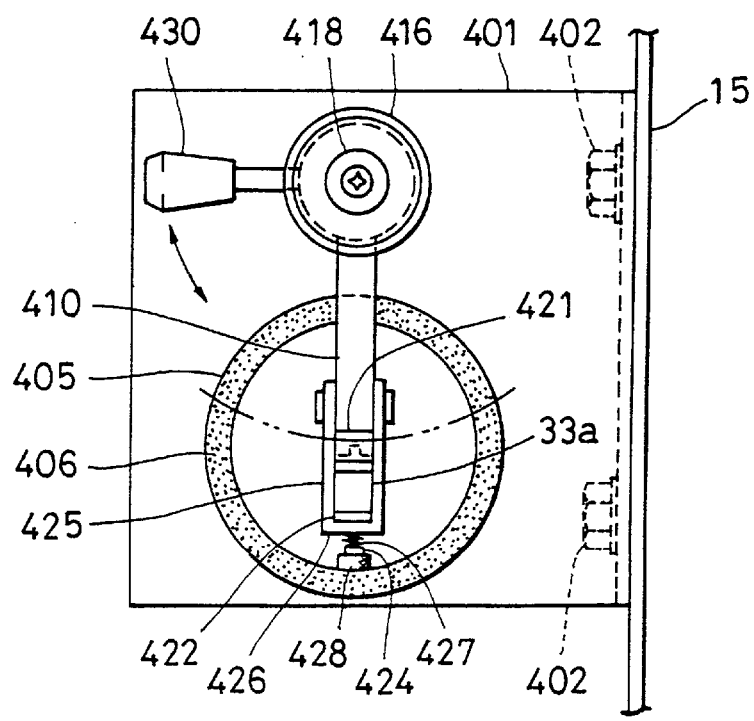

Hereinbelow means for grinding the blade of the cutting tool 33 of the table-top type key-seater according to the present invention will be explained, referring to FIGS. 16A and 16B. The grinding is achieved by a cutting tool blade grinding apparatus 400 mounted on a left side plate of the steel plate frame 11. FIGS. 16A and 16B are schematical diagrams for explaining the cutting tool blade grinding apparatus, FIG. 16A being a side view of the cutting tool blade grinding apparatus (hereinbelow called simply grinding apparatus) 400, partly indicated in cross-section, FIG. 16B being a plan view thereof. Explanation described here represents an embodiment of the grinding apparatus and it does not restrict the extent of the claims of the table-top type key-seater according to the present invention.

401 is a frame of the grinding apparatus, which is secured to the left side plate 15 of the steel plate frame 11 by means of bolts 402. 404 is a motor, which is secured to the frame 401 and so constructed that a torus-shaped diamond grindstone 405 is directly coupled therewith and that a grinding plane 406 rotates with a high speed in a constant and stable plane. An arm 410 mounted on a holder 408 for the cutting tool 33 is supported by a stud 412 perpendicular to the grinding plane 406 for the grindstone 405 implanted in the frame 401, rotatably in a plane parallel to the grinding plane 406.

On the other hand, the arm 410 is held at a determined position, put between a compression torsion spring 413 and a sliding ring 414, but it is slidable along the stud 412. It is possible to move it through the sliding ring 414 in collaboration with the compression torsion spring 413 by rotating a feeding handle 416 coupled by screw with a feeding screw 415 disposed at the extremity of the stud 412 and to bring it close to or for from the grinding plane 406 or to make it stand still at an arbitrary position. Rotation of the sliding ring 414 around the stud is prevented by a key 417. Displacement of the feeding handle 416 rightward in FIG. 16A is limited by a washer 418.

A fixed collar 419, into which the stud is inserted, can regulate energizing force acting on an arm 410 of a spring 413 by sliding it along the stud 412. Further a waiting position for the pivoting operation of the arm 410 can be set by rotating it around the stud 412. In this way, it is possible to select a correct position therefor and to fix it by means of a set screw 420. Since shanks 33a of all the cutting tools 33 are formed so as to be constant in shape and size as those proper to the apparatus, a cutting tool holder 408 disposed at the extremity of the arm 410 is constructed so as to have a particular size suitable to the shanks 33a.

421 is an angle setting jig for setting a front relief angle of the grinding plane of the cutting tool 33, which is magnetized and can be mounted stably within the holder. Since the front relief angle can be varied depending on material of the cutting tool 33, material of the piece to be processed 300, and conditions of the processing, it is possible to set easily a correct grinding angle after having mounted a corresponding angle setting jig 421. A clamp 422 is energized in a direction, in which it is separated from the angle setting jig 421 by a compression spring 427 wound between a pin head 424 of an implanted pin with head 423 and a clamping plate 426 of a cutting tool supporting frame 425, so that it is possible to bring it close to and far from the angle setting jig 421 in collaboration thereof with a clamping screw 428 and the compression spring 427.

Hereinbelow operation of the grinding apparatus 400 of the table-top type key-seater according to the present invention will be explained. If a cutting tool 33 having a bad sharpness is used, not only the extremity of the blade is deviated from a normal cutting path so that no accurate processing size of the key groove can be obtained, but also an unreasonable force acts thereon and finally causes a damage in the apparatus, which lowers significantly productivity. Since worsening in the sharpness can be judged, based on its cutting behavior, such a cutting tool should be dismounted immediately; a correct angle setting fig is mounted beforehand; the clamping plate 426 is separated from the angle setting jig 421 and inserted into a prepared cutting tool supporting frame 425, accompanied by the angle setting jig 421.

Since it is unnecessary to replace the angle setting jig 421 under same conditions of processing and the width of the inner wall of the cutting tool supporting frame 425 is fitted to the width of the shank 33a of the cutting tool 33, regulation therefor is not necessary. The feeding handle 416 is moved, until it is brought into contact with the washer 418 and the shank 33a is positioned within the cutting tool supporting frame 425 at a position, where the extremity of the blade of the cutting tool is in contact with the grinding plane 406. The shank 33a is pushed towards an incline surface of the angle setting jig 421 by means of pushing portions 429 protruding from the two extremities of the clamp 422 by manipulating the clamping screw 428 so that a positional relationship between the cutting tool 33 and the arm 410 is fixed.

The arm 410 is pivoted by means of a rotary handle 430 and the blade of the cutting tool 33 is brought into contact with the grinding plane 40 to grind it. The depth of grind is regulated by rotating appropriately the feeding handle 416. An amount of feed of the feeding handle 416 serving as a criterion for the depth of grind can be known from an indication (indicated in the figures) notched on the sliding ring 414 and a graduation notched on the tapered surface 413 of the feeding handle 416.

As explained above, since measuring means for setting a center position of processing is disposed in the table-top type key-seater according to the present invention, centering of a piece to be processed is easy. Further, since an amount of cutting for every going and returning of a cutting tool can be selected and there is disposed a mechanism, by which the apparatus is stopped automatically at a predetermined depth of a key groove previously set, manipulating operation is simple and sure. Therefore dealing with mass production becomes easier and it is possible to reduce cost for key groove processing significantly. In addition, since a bearing, which can stand for a heavy charge and has a resistance to a shock-like charge, is used in crank means, a steel plate frame construction can be applied thereto and the whole apparatus can be constructed so as to be small and light. Moreover, since installation work is unnecessary, the price is low and installation cost as well as management cost can be saved. Finally, since a cutting tool having a bad sharpness can be immediately regenerated at a site, productivity is increased and cutting tool management cost can be saved.

What is claimed is:

1. A table-top type key-seater comprising:

a reduction gear with a motor;

bearing means for supporting rotatably a driving shaft coupled directly to said reduction gear;

a reciprocating table provided with a cutting tool holder driven so as to reciprocate along a linear guide disposed in a perpendicular direction through crank means linked with said driving shaft in one body;

a cutting tool for cutting a key groove mounted on said cutting tool holder;

a work table for moving horizontally in left- and rightward directions, to which an object to be processed having a throughhole is secured;

a feed table for moving horizontally said work table in forward and backward directions;

measuring means for setting a center position of processing, starting from a displacement amount of said work table with respect to left and right contact positions of said cutting tool brought into contact with an inner wall of said throughhole;

feeding means for making said feed table move intermittently with a feed pitch for securing a predetermined depth of cut for every reciprocation of said cutting tool in synchronism with reciprocating movement of said cutting tool; and means for setting a depth of said key groove, which stops the reciprocating drive of said cutting tool at an upper limit in a perpendicular direction, when a cut of said key groove reaches a predetermined depth of said key groove, wherein said work table is electrically insulated so that contact of said cutting tool with said inner wall of said throughhole is capable of being detected electrically.

2. A table-top type key-seater comprising:

a reduction gear with a motor;

bearing means for supporting rotatably a driving shaft coupled directly to said reduction gear;

a reciprocating table provided with a cutting tool holder driven so as to reciprocate along a linear guide disposed in a perpendicular direction through crank means linked with said driving shaft in one body;

a cutting tool for cutting a key groove mounted on said cutting tool holder;

a work table for moving horizontally in left- and rightward directions, to which an object to be processed having a throughhole is secured;

a feed table for moving horizontally said work table in forward and backward directions;

measuring means for setting a center position of processing, starting from a displacement amount of said work table with respect to left and right contact positions of said cutting tool brought into contact with an inner wall of said throughhole;

feeding means for making said feed table move intermittently with a feed pitch for securing a predetermined depth of cut for every reciprocation of said cutting tool in synchronism with reciprocating movement of said cutting tool;

means for setting a depth of said key groove, which stops the reciprocating drive of said cutting tool at an upper limit in a perpendicular direction, when a cut of said key groove reaches a predetermined depth of said key groove; and grinding means for regenerating an edge of a blade of said cutting tool at a predetermined angle disposed on a frame supporting said reciprocating table, wherein said grinding means includes a torus-shaped diamond grinder coupled directly with a grinding motor so as to rotate with a high speed; a stud mounted perpendicular to a rotation plane of said grinder; and an arm supported rotatably by said stud, said arm being movable along an axial line of said stud so as to be set at an arbitrary position, and said arm being provided with a holder for holding a grinding plane of said grinder and the axial line of said cutting tool with a predetermined angle therebetween.

3. A table-top type key-seater comprising:

a reduction gear with a motor;

bearing means for supporting rotatably a driving shaft coupled directly to said reduction gear;

a reciprocating table provided with a cutting tool holder driven so as to reciprocate along a linear guide disposed in a perpendicular direction through crank means linked with said driving shaft in one body;

a cutting tool for cutting a key groove mounted on said cutting tool holder;

a work table for moving horizontally in left- and rightward directions, to which an object to be processed having a throughhole is secured;

a feed table for moving horizontally said work table in forward and backward directions;

measuring means for setting a center position of processing, starting from a displacement amount of said work table with respect to left and right contact positions of said cutting tool brought into contact with an inner wall of said throughhole;

feeding means for making said feed table move intermittently with a feed pitch for securing a predetermined depth of cut for every reciprocation of said cutting tool in synchronism with reciprocating movement of said cutting tool; and means for setting a depth of said key groove, which stops the reciprocating drive of said cutting tool at an upper limit in a perpendicular direction, when a cut of said key groove reaches a predetermined depth of said key groove, wherein said measuring means comprises length measuring means provided with display means.

4. A table-top type key-seater comprising:

a reduction gear with a motor;

bearing means for supporting rotatably a driving shaft coupled directly to said reduction gear;

a reciprocating table provided with a cutting tool holder driven so as to reciprocate along a linear guide disposed in a perpendicular direction through crank means linked with said driving shaft in one body;

a cutting tool for cutting a key groove mounted on said cutting tool holder;

a work table for moving horizontally in left- and rightward directions, to which an object to be processed having a throughhole is secured;

a feed table for moving horizontally said work table in forward and backward directions;

measuring means for setting a center position of processing, starting from a displacement amount of said work table with respect to left and right contact positions of said cutting tool brought into contact with an inner wall of said throughhole;

feeding means for making said feed table move intermittently with a feed pitch for securing a predetermined depth of cut for every reciprocation of said cutting tool in synchronism with reciprocating movement of said cutting tool; and means for setting a depth of said key groove, which stops the reciprocating drive of said cutting tool at an upper limit in a perpendicular direction, when a cut of said key groove reaches a predetermined depth of said key groove, wherein said feeding means comprises a first air cylinder; a swing arm pivoting while reciprocating a piston of said first air cylinder; a clutch disk supporting a pivoting shaft of said swing arm pivotably and coaxially; a screw member coaxial with said clutch disk, rotated in one body therewith, and screwed into a part of said feed table; and a second air cylinder disposed on said swing arm, a piston of said second air cylinder driving a clutch lever only when said swing arm is pivoted on one side to couple said clutch disk with said swing arm and to make said screw member pivot intermittently, and pitch setting means is disposed for moving said feed table with a pitch corresponding to a pivot angle of said screw member.

5. A table-top type key-seater according to claim 4, wherein said pitch setting means includes an eccentric cam member for limiting pivoting of said swing arm by bringing a peripheral surface thereof into contact with an end portion of said swing arm, an extent of pivot of said swing arm being arbitrarily selectable by varying the length of cam radius due to pivoting of said eccentric cam member, an intermittent feeding pitch of said feed table being set by the pivot angle of said screw member.

6. A table-top type key-seater according to claim 5, wherein said eccentric cam member has a polygonal shape, in which distances from a pivot center to different sides forming a peripheral surface are different from each other, one side thereof, capable of being brought into contact with said swing arm, being selected by stepwise pivoting thereof so that said feeding pitch can be set in a stepwise manner.

7. A table-top type key-seater comprising:

a reduction gear with a motor;

bearing means for supporting rotatably a driving shaft coupled directly to said reduction gear;

a reciprocating table provided with a cutting tool holder driven so as to reciprocate along a linear guide disposed in a perpendicular direction through crank means linked with said driving shaft in one body;

a cutting tool for cutting a key groove mounted on said cutting tool holder;

a work table for moving horizontally in left- and rightward directions, to which an object to be processed having a throughhole is secured;

a feed table for moving horizontally said work table in forward and backward directions;

measuring means for setting a center position of processing, starting from a displacement amount of said work table with respect to left and right contact positions of said cutting tool brought into contact with an inner wall of said throughhole;

feeding means for making said feed table move intermittently with a feed pitch for securing a predetermined depth of cut for every reciprocation of said cutting tool in synchronism with reciprocating movement of said cutting tool; and means for setting a depth of said key groove, which stops the reciprocating drive of said cutting tool at an upper limit in a perpendicular direction, when a cut of said key groove reaches a predetermined depth of said key groove, wherein said means for setting a depth of said key groove includes a reference block; a guiding member for guiding linearly said reference block in forward and backward directions with respect to said feed table; a feeding screw capable of moving a position of said reference block relative to said feed table in forward and backward directions; tube-shaped supporting means extending parallel to said feeding screw from a base inserted into said reference block, into which a spindle extending from a micrometer head mounted on the extremity opposite to said base towards said base is freely inserted, a setting block for bringing into contact with an extremity of said spindle further extending from said base of said tube-shaped supporting means, protruding therefrom and capable of advancing along said guiding member side by side with said reference block; and a tensile spring stretched between said setting block and said reference block for securing contact of said extremity of said spindle with said setting block, first and second sensing members disposed on said reference block and said setting block, respectively, for detecting a position of an acting member disposed on a lower portion of said feed table, said reference block being positioned at a position, where said first sensing member is capable of reacting to start cutting of said key groove, said key-seater stopping the cutting, when said second sensing member detects said acting member of said feed table having moved over a relative separation distance between said reference block and said setting block as set by means of said micrometer head.

8. A table-top type key-seater according to claim 7, wherein a pushing screw is screwed on an axial line of said spindle from the opposite side of said setting block so that the extremity of said spindle is capable of contacting with an extremity of said pushing screw and a distance between said setting block and said reference block is regulated by varying a depth of coupling by screwing of said pushing screw.

9. A table-top type key-seater according to claim 7, wherein a third sensing member is disposed separately at a position deviated slightly towards the reference block side with respect to said second sensing member mounted on said setting block and when said third sensing member detects said acting member, a piston of a third air cylinder is made to protrude and the feed pitch of said feeding means is switched over to a certain pitch set at a further smaller value, independently from setting by a pitch setting means.

* * * * *